(12) United States Patent
Tsutsumi et al.

(10) Patent No.: US 8,598,739 B2
(45) Date of Patent: Dec. 3, 2013

(54) ELECTRIC RAILWAY POWER-SUPPLY SYSTEM

(75) Inventors: Kazuo Tsutsumi, Kobe (JP); Takahiro Matsumura, Kobe (JP); Chiyoharu Tonda, Sakai (JP); Kazuya Nishimura, Kakogawa (JP); Fumiya Goto, Kobe (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 601 days.

(21) Appl. No.: 12/919,983

(22) PCT Filed: Feb. 26, 2009

(86) PCT No.: PCT/JP2009/053552
§ 371 (c)(1),
(2), (4) Date: Nov. 4, 2010

(87) PCT Pub. No.: WO2009/107715
PCT Pub. Date: Sep. 3, 2009

(65) Prior Publication Data
US 2011/0043038 A1    Feb. 24, 2011

(30) Foreign Application Priority Data

Feb. 29, 2008  (JP) ................................ 2008-051409
Aug. 5, 2008   (JP) ................................ 2008-202052

(51) Int. Cl.
    *H02J 3/32*    (2006.01)
(52) U.S. Cl.
    USPC .......................................... 307/48; 307/9.1
(58) Field of Classification Search
    USPC .................................................. 307/48, 9.1
    See application file for complete search history.

(56) References Cited

U.S. PATENT DOCUMENTS

| 2,675,490 A * | 4/1954 | Portail .......................... 307/48 |
| 6,027,831 A | 2/2000 | Inoue et al. |
| 6,458,486 B1 | 10/2002 | Suzuki et al. |
| 7,531,270 B2 * | 5/2009 | Buck et al. .................... 429/120 |
| 2004/0241540 A1 | 12/2004 | Tsutsumi et al. |
| 2010/0112427 A1 | 5/2010 | Tsutsumi et al. |

FOREIGN PATENT DOCUMENTS

| CN | 1186348 | 7/1998 |
| JP | 2000-341874 | 12/2000 |
| JP | 2001-260719 | 9/2001 |
| JP | 2002-2334 | 1/2002 |

(Continued)

OTHER PUBLICATIONS

Russian Office Action issued Dec. 12, 2011 in Application No. 2010139876.

(Continued)

*Primary Examiner* — Robert L. Deberadinis
(74) *Attorney, Agent, or Firm* — Wenderoth, Lind & Ponack, L.L.P.

(57) ABSTRACT

To present an electric railway power-supply system not requiring vast area for installation, excellent in rapid charge-discharge characteristic, and low in manufacturing cost. At a substation 9 for electric railway having a transformer 3 for receiving power from an alternating-current power line 2, a rectifying device 4 connected to the transformer 3, and a feeder line 5 connected to the rectifying device 4, a nickel hydrogen battery 8 is provided as a direct-current supply facility, and the nickel hydrogen battery 8 is directly coupled to the feeder line 5.

27 Claims, 15 Drawing Sheets

(56) References Cited

FOREIGN PATENT DOCUMENTS

| | | |
|---|---|---|
| JP | 2005-206111 | 8/2005 |
| JP | 2007-66647 | 3/2007 |
| KR | 10-2006-0073067 | 6/2006 |
| RU | 40264 | 9/2004 |
| RU | 2259284 | 9/2004 |
| TW | 475291 | 2/2002 |
| WO | 2003/028142 | 4/2003 |
| WO | 2008/099609 | 8/2008 |

OTHER PUBLICATIONS

Chinese Office Action issued Apr. 24, 2012 in corresponding Chinese Application No. 200980107092.0, with English translation.
International Preliminary Report on Patentability issued Oct. 21, 2010 in International (PCT) Application No. PCT/JP2009/053552.
International Search Report issued Jun. 2, 2009 in International (PCT) Application No. PCT/JP2009/053552.
Examination Report issued Jul. 5, 2012 in Singapore Patent Application No. 201006283-4.

* cited by examiner $$\frac{dV_1}{V_1} = \frac{dV_2}{V_2} = \frac{dV_3}{V_3}$$

ELECTRIC RAILWAY POWER-SUPPLY SYSTEM

TECHNICAL FIELD

The present invention relates to an electric railway power-supply system for supplying electric power to power lines for electric railway.

BACKGROUND ART

Generally, a substation for electric railway converts alternating-current power supplied from an electric power company or alternating-current power supplied from a power plant owned by an electric railway company into direct-current power, and supplies to feeder lines. The direct-current power supplied to the feeder lines passes through aerial power lines, and is supplied into electric vehicles by way of pantographs. Or the direct-current power is supplied from the feeder lines to the electric vehicles by way of a third rail. The electric vehicle supplies the provided electric power to a traction motor (rotary motor or linear motor) by way of an electric power control device mounted on the vehicle, and the electric energy is converted into a traction energy, and the vehicle is driven.

The amount of energy consumed by an electric vehicle varies with the running state of the vehicle. Specifically, the electric vehicle consumes a large amount of electric power in a short time at the time of acceleration. As a result, the voltage of the power line or the third rail, and further the voltage of the feeder line drops temporarily. To cope with such temporary voltage drop, a railway facility accommodating electric vehicles having a regenerative function utilizes the rotary motor or linear motor for traction as a generator at the time of deceleration, and converts the running energy of the electric vehicle into an electric energy in order to recover an electric power. The recovered electric power is utilized to cover up for the temporary voltage drop of the supply voltage.

Patent document 1: JP 2000-341874 A
Patent document 2: JP 2001-260719 A
Patent document 3: JP 2002-2334 A

DISCLOSURE OF INVENTION

Technical Problem

The recovered electric power generated in the motor at the time of deceleration of an electric vehicle having a regenerative function is transmitted from the power line or the third rail to the feeder line by the electric power control device of the electric vehicle. At this time, if there is any other electric vehicle running on the track, the regenerated power is consumed by this electric vehicle. However, if there is no accelerating electric vehicle on the track, the regenerated electric power is utilized to temporarily elevate the voltage of the power line or the third rail by way of the electric power wiring in the electric vehicle. At this time, there is no problem when the voltage elevation is small, but if the voltage elevation is large, troubles may occur in operation of electric power facilities in the electric vehicle or other electric facilities installed in the railway facilities. In particular, if the elevated voltage exceeds the withstand voltage of an electric facility, the facility may be damaged.

To solve such problem, the electric power control device of the electric vehicle controls to suppress occurrence of regenerated power exceeding a specified voltage, that is, to limit the regeneration. Moreover, if the voltage of the power line or the line is extremely high, the electric power control device controls to suspend the regeneration of electric power. As a result, the regeneration fails. However, in the event of limitation or failure of regeneration, the electric vehicles utilizes a mechanical brake for reducing the speed as required, and the running energy is converted into a thermal energy, and is spent wastefully. At the same time, brake pads are worn, and the maintenance cost is raised.

Accordingly, to prevent failure of regeneration, it has been proposed to use a regenerative chopper for converting the regenerated electric power into a thermal energy by a resistor. It is also proposed to install an inverter having a capacity of converting the regenerative power into alternating-current power in a substation, and to convert the regenerative power into a commercial frequency alternating-current power to return to the electric power system from the substation, or to use in the railway station facilities.

Patent document 1 discloses a charging-discharging device for an electric railway having a lead storage battery connected to the feeder line in order to level out the load of electric power.

Further, patent documents 2 and 3 disclose an electric railway power-supply system (power source facility) installed at a substation, in which an electric power storage device having a secondary battery or electric double layer capacitor is connected to a feeder line by way of a charge-discharge control device, such as a boosting and step-down chopper.

However, in such method of using the regenerative chopper for converting the regenerative power into a thermal energy by a resistor, the regenerative power is spent wastefully. In the method of returning the regenerative power into the electric power system or using in station facilities by using the inverter installed at the substation, indeed, the regenerative power is utilized effectively, but an expensive inverter is needed, and thus the facility cost is higher.

The lead storage battery disclosed in patent document 1, however, is not suited to be used in an electric railway power-supply system. The reason is as follows. An electric vehicle consumes a large amount of electric power in an initial period of its acceleration, whereas an electric vehicle having a regenerative function generates a large amount of regenerative power in an initial period of its deceleration. Therefore, the storage battery to be connected to the electric power supply system is required to have a sufficient charging and discharging capacity to cope with sudden variations of load. However, the lead storage battery does not have such sufficient charging and discharging capacity to cope with sudden variations of load. Accordingly, to utilize the lead storage battery in storage of regenerative power, a multiplicity of lead storage batteries should be needed. Hence, a vast area for installation is required.

The charge-discharge control device used in the electric railway power-supply system (power source facility) disclosed in patent documents 2 and 3 is very expensive. In addition, since the charge-discharge control device is poor in response, the suddenly increased regenerative power cannot be stored (charged) efficiently. Further, the boosting and step-down chopper used as the charge-discharge control device may generate harmonic noise which may disturb the signal device. Still more, if the voltage to be supplied to the feeder line from the substation for electric railway fluctuates due to variations of received voltage supplied from the electric power company, normal operation of the charge-discharge control device cannot be guaranteed.

Besides, the feeder line, having its own resistance, is accompanied by a large voltage drop as departing away from the substation for electric railway. Therefore, when an electric vehicle located at a position remote from the electric railway substation is accelerated, running of the vehicle may be disturbed by the voltage drop.

Further, also when regenerating electric power from an electric vehicle at a location remote from the electric railway station, the line voltage may be elevated suddenly by the electric power regenerated from a decelerating electric vehicle, and limiting of regeneration or failure of regeneration may occur.

The present invention is devised to solve the above problems, and it is hence an object thereof to present an electric railway power-supply system excellent in fast charging and discharging capacity and low in cost, not requiring a vast area for installation. It is also an object of the present invention to present an electric railway power-supply system capable of maintaining a stable running performance of electric vehicle even at a location remote from a substation, and not spending the running energy wastefully due to failure of regeneration or the like.

Technical Solution

To achieve these objects, the electric railway power-supply system having a nickel hydrogen battery of the present invention includes a nickel hydrogen battery as a direct-current electric power facility, being installed in a substation for electric railway having a transformer for receiving electric power from an alternating-current power circuit, a rectifying device connected to the transformer, and feeder lines connected to the rectifying device, in which the nickel hydrogen battery is directly coupled to the feeder liners. Herein, being "directly coupled" means that it is connected directly without using a charge-discharge control device.

In the present invention, preferably, a nickel hydrogen battery is used. The nickel hydrogen battery is small in internal resistance, small in voltage variations due to variations of SOC (state of charge), and high in availability of battery capacity, and hence it can be connected directly to the feeder line by using a battery of a smaller capacity as compared with other secondary battery, and it does not require vast area for installation. Besides, the nickel hydrogen battery is small in voltage variations, and the charge-discharge control device is not needed, and space for installation of charge-discharge control device is not necessary. Since an expensive charge-discharge control device is not used, the entire equipment is low in cost. Moreover, since the nickel hydrogen battery is high in volume energy density, it does not need vast area for installation. Further, the nickel hydrogen battery is, unlike the charge-discharge control device, free from operation delay, and is excellent in rapid charge-discharge characteristic. Still more, if the boosting and step-down chopper used as a charge-discharge control device can be omitted, there is no risk of occurrence of harmonic noise which may disturb the signal device. The nickel hydrogen battery is small in internal resistance, and small in voltage variations due to variations of SOC, and it is suited more than other batteries for suppressing decline of voltage by discharging from the nickel hydrogen battery if a large current is needed in a very short time during acceleration of electric vehicle. If the electric vehicle regenerates, and generates a large current in an extremely short time, the nickel hydrogen battery is more suited than other batteries for suppressing elevation of voltage by charging. Therefore, the feeder line voltage can be stabilized, and it contributes to efficiency of operation of electric vehicle.

Preferably, the nickel hydrogen battery includes at least one battery module. Preferably, the battery module is structured such that between a pair of opposite current collector plates a plurality of unit batteries having positive electrode cells and negative electrode cells partitioned by separators are stacked up so that the positive electrode cell of one of the adjacent unit batteries and the negative electrode cell of the other of the adjacent unit batteries are opposed, between the adjacent unit batteries, a common current collector plate serving as a dividing wall between the positive electrode cell of one unit battery and the negative electrode cell of the other unit battery is provided, and the common current collector has a communication passage of heat transfer medium made of gas or liquid.

According to this configuration, heat generation of nickel hydrogen battery can be suppressed effectively, deterioration of the battery can be suppressed, and the battery life can be extended. Further, by forming the battery module by stacking up unit batteries as described above, the equivalent internal resistance of battery module can be suppressed much lower. By composing the nickel hydrogen battery by using battery modules thus composed by stacking up unit batteries, the size is further reduced, and the area for installation can be saved.

The common current collector may be made of a porous metal plate.

The common current collector may be made of a metal plate provided with a plurality of communication holes used as communication passage of the heat transfer medium. When an aluminum plate is used as metal plate, the conductivity is improved, and an excellent heat conduction is realized.

Preferably, the nickel hydrogen battery includes at least one battery module, and the battery module includes a plurality of unit batteries, each unit battery includes plate-shaped positive and negative electrode current collectors which are provided oppositely to each other, a separator disposed between the positive electrode current collector and the negative electrode current collector, and a positive electrode cell contacting the positive electrode current collector and a negative electrode cell contacting the negative electrode current collector, the plurality of unit batteries are stacked up so that the positive electrode current collector of one of the adjacent unit batteries is opposed to the negative electrode current collector of the other unit battery, and a communication passage of heat transfer medium of gas or liquid is provided between the mutually adjacent unit batteries.

According to this configuration, heat generation of nickel hydrogen battery can be suppressed effectively, deterioration of the battery can be suppressed, and the battery life can be extended. Further, by forming the battery module by stacking up unit batteries as described above, the equivalent internal resistance of battery module can be suppressed much lower. By composing the nickel hydrogen battery by using battery modules thus composed by stacking up unit batteries, the size is further reduced, and the area for installation can be saved.

Preferably, the nickel hydrogen battery includes at least one battery module, and the battery module includes a plurality of unit batteries, each unit battery has a structure in which a space between plate-shaped positive and negative electrode current collectors which are disposed oppositely to each other is filled with an electrolyte solution, a plurality of the positive electrode sheets are disposed from the positive electrode current collector toward the negative electrode current collector and a plurality of the negative electrode sheets are disposed from the negative electrode current collector toward the positive electrode current collector so that a positive electrode sheet having a positive electrode active material and a negative electrode sheet having a negative electrode active material may be assembled alternately, and a separator is interposed between each positive electrode sheet and each negative electrode sheet, the plurality of unit batteries are stacked up so that the positive electrode current collector of one of the adjacent unit batteries is opposed to the negative electrode current collector of the other unit battery, and a communication passage of heat transfer medium of gas or liquid is provided between the mutually adjacent unit batteries.

According to this configuration, heat generation of nickel hydrogen battery can be suppressed effectively, deterioration of the battery can be suppressed, and the battery life can be extended. Further, by forming the battery module by stacking up unit batteries as described above, the equivalent internal resistance of battery module can be suppressed much lower. By composing the nickel hydrogen battery by using battery modules thus composed by stacking up unit batteries, the size is further reduced, and the area for installation can be saved.

Alternatively, a conductive heat transfer plate having communication holes in the communication passage of the heat transfer medium may be inserted between one of the mutually adjacent unit batteries and the other unit battery, so that the heat transfer plate contacts the positive electrode current collector of one unit battery and the negative electrode current collector of the other unit battery.

The heat transfer plate may be made of an aluminum plate. The aluminum plate is small in electric resistance, and is excellent in heat conductivity. More preferably, by plating the aluminum plate with nickel, the contact resistance is decreased.

Further, between one of the adjacent unit batteries and the other unit battery, a plurality of conductive members may be inserted so that each conductive member contacts the positive electrode current collector of one unit battery and the negative electrode current collector of the other unit battery, and that a communication-passage is formed between one of the adjacent unit batteries and the other unit battery.

The conductive member may be an aluminum plate having the surface plated with nickel. The aluminum plate is small in electric resistance, and by plating with nickel, the contact resistance is further lowered, and it is preferable as the conductive member.

To achieve the object, the electric railway power-supply system of the present invention includes a feeder line which is coupled to a substation for an electric vehicle and receives direct-current power from the substation, and an electric power storage and supply device having a nickel hydrogen battery, wherein the nickel hydrogen battery is directly coupled to the feeder line, and the electric power storage and supply device is installed at a different place from the yard of the substation.

In particular, by constructing the electric power storage and supply device by directly coupling a nickel hydrogen battery to a feeder line at a location remote from the substation, for example, a feeder line near an intermediate point of a substation and another substation, or an end portion of a feeder line corresponding to a terminal end or an initial end of the track, at a location remote from the substation, large voltage drop of the feeder line can be suppressed, and the running performance of the electric vehicle can be sufficiently exhibited, and by suppressing large voltage drop of the feeder line, wasteful spending on the running energy of the electric vehicle due to regeneration failure or the like can be suppressed. Moreover, the electric power storage and supply device having the nickel hydrogen battery directly coupled to the feeder line is inexpensive as compared with the substation.

Herein, the "yard" refers to the site of demand, including the point of use of electricity, and all area using electricity. The yard also includes the regions partitioned by fence, barrier, barricade, channel or the like, off-limits for others than the workers or related people, and similar regions from geographical, social or other points of view.

Further, a "different place from the yard of the substation" is a place called power feeding point or facility in the electric railway power-supply system. At such power feeding point, generally, transformer is not installed, but secondary battery or other electric power storage and supply facility is installed.

Advantageous Effects

The present invention provides an electric railway power-supply system, not requiring vast area for installation, excellent in rapid charging and discharging characteristic, and inexpensive in manufacture. The electric railway power-supply system of the invention is useful for saving energy, preventing regeneration failure, cutting the peak, and suppressing power line voltage drop.

Moreover, the invention provides a electric railway power-supply system, capable of extracting the running performance of electric vehicle sufficiently at a location remote from the substation, and suppressing wasteful spending of running energy of electric vehicle due to regeneration failure or the like. If power cannot be transmitted due to power failure or trouble at the substation, the nickel hydrogen battery installed at the substation and the electric power storage and supply device containing the nickel hydrogen battery are utilized to drive the vehicle to a nearest railway station without stopping the auxiliary machines of the vehicle. Further, for a short time, the nickel hydrogen battery installed at the substation and the electric power storage and supply device containing the nickel hydrogen battery may be used in place of the substation, and the maintenance and servicing of the substation may be easy.

Figure 1:
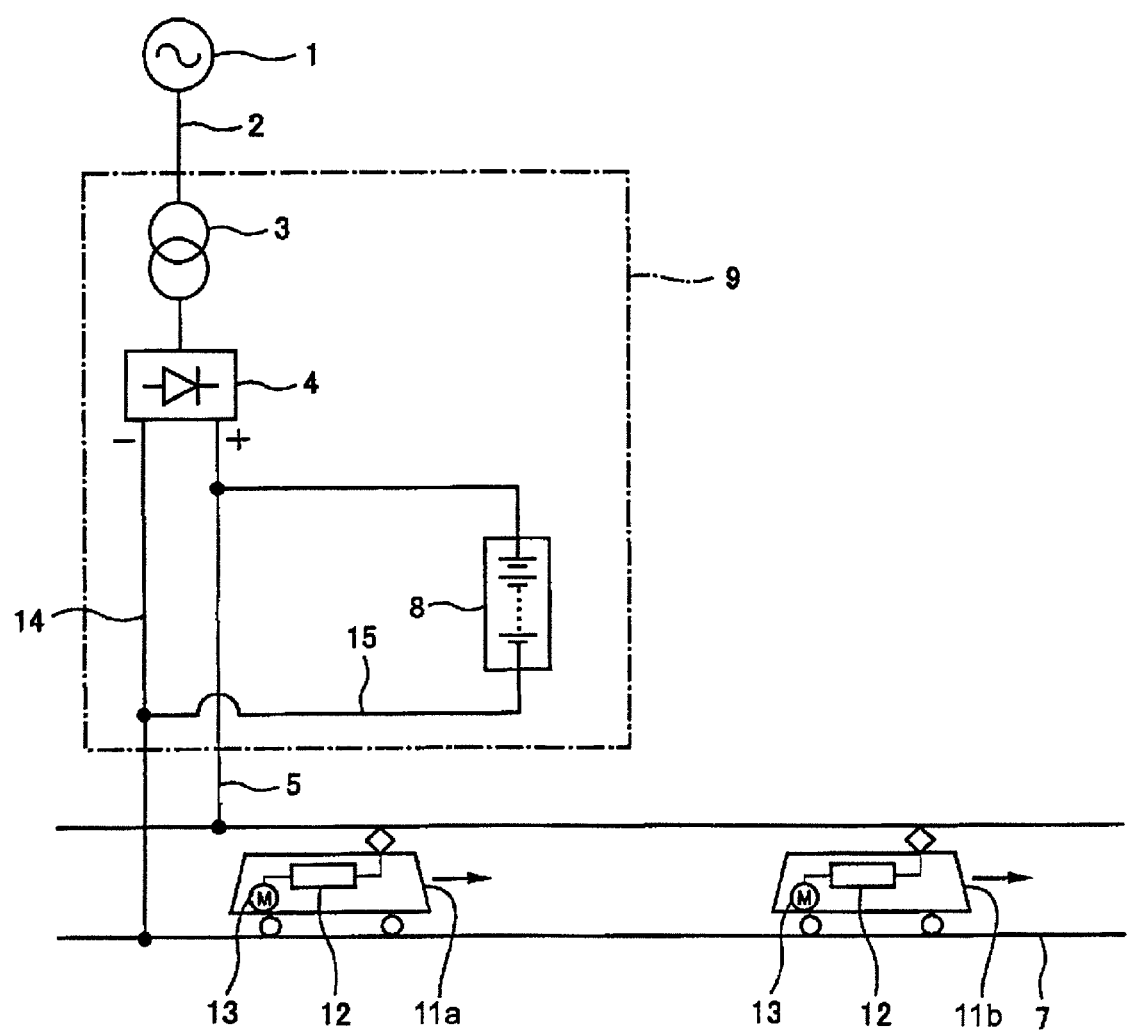
FIG. 1 is an outline structural diagram of an electric railway power-supply system provided with a nickel hydrogen battery in a first preferred embodiment of the invention.

EXPLANATION OF REFERENCE 1 alternating-current power source
2 alternating-current power line
3 transformer
4 rectifying device
5 feeder line
7 return conductor
8 nickel hydrogen battery
9 substation for electric railway
9a, 9b substation for electric railway
10a, 10b electric power storage and supply device
11, 11a, 11b, 11c electric vehicle
40 battery module
41 unit battery
42 ion permeable separator
43 positive electrode cell
44 negative electrode cell
45 positive electrode current collector
46 negative electrode current collector
47 current collector member
48 oxygen cylinder
49 pressure regulating valve
50 path
51a, 51b, 51c, 51d, 51e, 51f valve
52a, 52b, 52c, 52d, 52e, 52f valve
53 fan
61 positive electrode active material sheet
62 ion permeable separator
63 negative electrode active material sheet
64 negative electrode terminal
65 positive electrode terminal
71 positive electrode active material sheet
72 ion permeable separator
73 negative electrode active material sheet
74 positive electrode terminal
75 negative electrode terminal
76, 77 insulator
81 battery module
82, 84 air communication space
83a, 83b intake fan
85 positive electrode plate
85S positive electrode cell
86 negative electrode plate
86S negative electrode cell
87 ion permeability separator
88 air communication passage
89 conductive member
90, 91, 92, 93 insulator
94 positive electrode terminal
95 negative electrode terminal
96 heat transfer plate
97 air communication passage
98 battery module
99 positive electrode current collector
100 negative electrode current collector
101 ion permeable separator
102 electrolyte solution
103 positive electrode sheet
104 negative electrode sheet
105 unifying positive electrode current collector
106 unifying negative electrode current collector
107, 108 insulator
111 positive electrode current collector
112 negative electrode current collector
113 insulator
114 ion permeable separator
115 positive electrode cell
116 negative electrode cell
117 nonwoven cloth of polypropylene fiber
118 molded body of nickel foam
119 nonwoven cloth of polypropylene fiber
120 molded body of nickel foam

BEST MODE FOR CARRYING OUT THE INVENTION

Hereinafter, preferred embodiments of the present invention are described specifically by reference to the accompanying drawings.

First Preferred Embodiment

1. Configuration and Operation of Electric Railway Power-Supply System

FIG. 1 is an outline structural diagram of an electric railway power-supply system provided with a nickel hydrogen battery in a first preferred embodiment of the invention.

As shown in FIG. 1, a substation for electric railway (hereinafter called "substation") 9 includes a transformer 3 for receiving alternating-current power from an alternating-current power source 1 connected to an electric power system by way of an alternating-current power line 2, a rectifying device 4 connected to the transformer 3, and a nickel hydrogen battery (detail described below) 8 connected in parallel to the rectifying device 4. The rectifying device 4 has its positive side terminal connected to a feeder line 5, and negative side terminal to a return conductor 7 by way of a wiring 14. A nickel hydrogen battery 8 is directly coupled to the feeder line 5 and a wiring 15. More specifically, the nickel hydrogen battery 8 has its positive electrode side external terminal connected to the feeder line 5, and negative electrode side external terminal connected to the return conductor (rail) 7 by way of the wiring 15. In other words, the nickel hydrogen battery 8 is connected to the feeder line 5 without resort to a charge-discharge control device for controlling charge-discharge voltage or charge-discharge current, or charge-discharge voltage and charge-discharge current.

In the electric railway power-supply system thus constructed, the rectifying device 4 converts the alternating-current voltage from the transformer 3 into direct-current voltage, and outputs to the feeder line 5. The direct-current voltage output from the rectifying device 4 is supplied into electric vehicles 11a and 11b by way of electric car wires, that is, power lines, via the feeder line 5. In the electric vehicles 11a and 11b, the supplied direct-current power is converted into alternating current by, for example, a power control device 12 on a vehicle, and is supplied into a motor 13 for running and auxiliary machines. The regenerative power generated in the electric vehicles 11a and 11b is supplied into the nickel hydrogen battery 8 by way of the feeder line 5, and the nickel hydrogen battery 8 is charged. The electric power accumulated in the nickel hydrogen battery 8 is then supplied into the electric vehicles 11a and 11b, depending on the voltage state of the feeder line 5.

For example, if the electric vehicle 11a is a regenerative vehicle in braked state, and the electric vehicle lib is an accelerating vehicle in accelerated state, the regenerative current from the regenerative vehicle is supplied to the accelerating vehicle, and an excess regenerative current flows into the nickel hydrogen battery 8, and the nickel hydrogen battery 8 is charged. On the other hand, when the both electric vehicles 11a and 11b are accelerating vehicles, the discharge current from the nickel hydrogen battery 8 is supplied into the accelerating vehicles from the feeder line 5 by way of electric wires. This is an operation in charging and discharging of the nickel hydrogen battery 8, and the operation is not limited to this example alone.

In short, the nickel hydrogen battery 8 is charged when the voltage between the feeder line 5 and the return conductor 7 (hereinafter called the "feeder line voltage") is higher than the electromotive force of the nickel hydrogen battery 8 (hereinafter called the "battery voltage"), and is discharged when it is lower. In this manner, in the nickel hydrogen battery 8, floating charging and floating discharge are executed. Herein, the nickel hydrogen battery 8 is composed so as to have a battery voltage equivalent to the average of the feeder line voltage.

As described above, in the electric railway power-supply system of the preferred embodiment, at the substation 9, the nickel hydrogen battery 8 is directly coupled to the feeder line 5 and the wiring 15. Hence, a power supply system which is simple in entire structure, excellent in rapid charging and discharging characteristic, and low in cost can be built up.

The rectifying device 4 may be either full-wave rectifier or half-wave rectifier, or may be an electric power converter or so-called DC-DC converter composed by using a control element such as IGBT. The alternating-current power source 1 is usually a commercial power source system, but it is not limited, and it may be an electric power system such as a non-utility substation. The electric vehicle is not limited to an electric train running on the ground, but may include a subway train, streetcar, or LRV (light rail vehicle). The substation 9 shown in FIG. 1 is provided with the transformer 3, the rectifying device 4, and the nickel hydrogen battery 8, and may be also provided with an inverter for returning the regenerative power into an alternating-current power line, or a charge-discharge control device, such as boosting and step-down chopper as in a structural example of the prior art.

The nickel hydrogen battery 8 may be composed of a single battery module having a battery voltage equivalent to the average of the feeder line voltage. Alternatively, the nickel hydrogen battery 8 may be composed as a series connection of a plurality of battery modules (hereinafter this structure is called a "series battery module") so as to be capable of issuing a battery voltage equivalent to the average of feeder line voltage. Furthermore, the single battery module or the series battery module may be connected in parallel. When connected in parallel, the battery capacity is increased, but the equivalent internal resistance is lowered. The battery module is composed by series connection of a plurality of single unit batteries.

Figure 2:
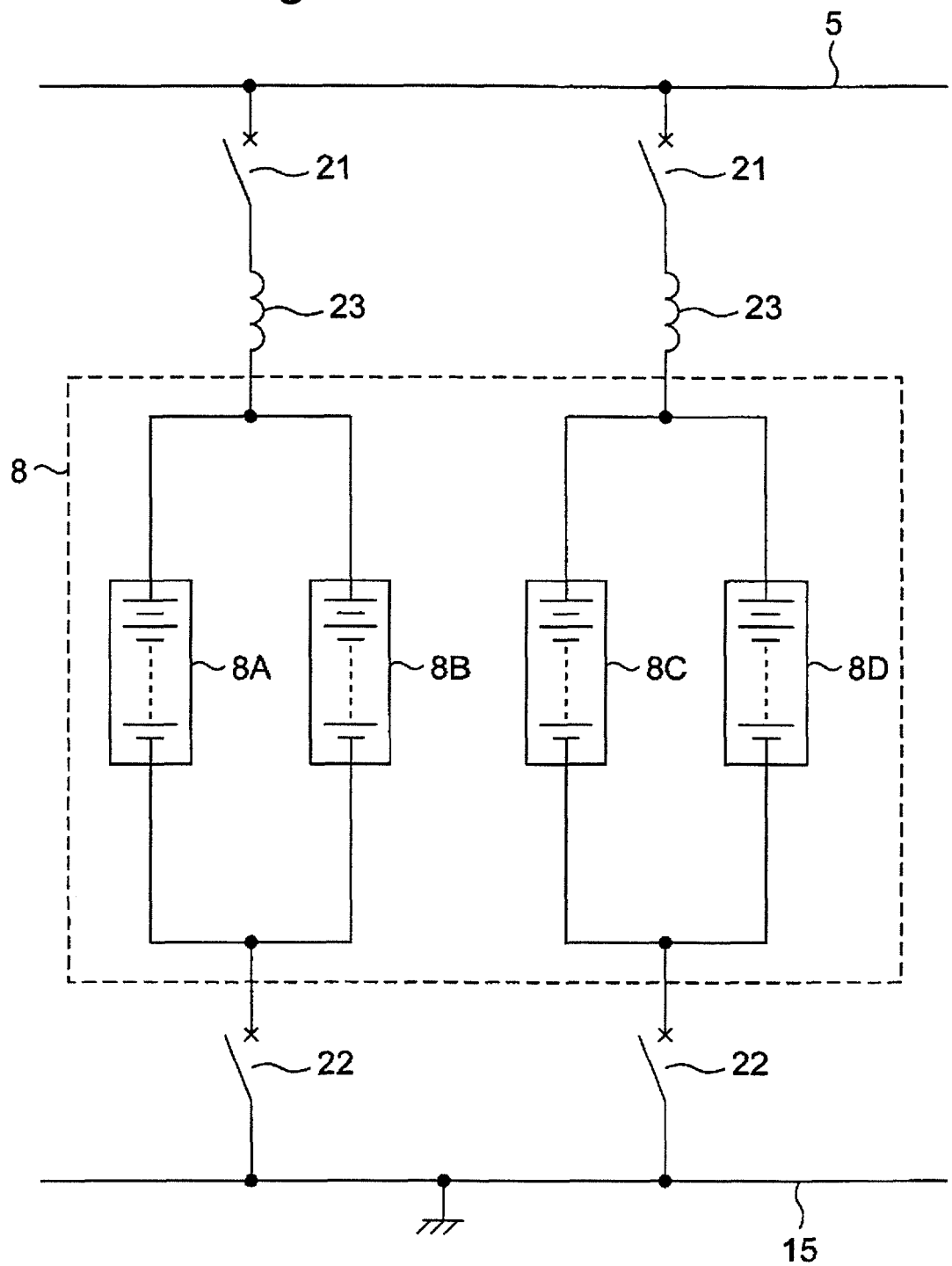
FIG. 2 is a circuit diagram showing an exemplary embodiment of the nickel hydrogen battery in the first preferred embodiment of the invention.

FIG. 2 is a diagram showing an example of structure of the nickel hydrogen battery 8 in the preferred embodiment. In the configuration shown in FIG. 2, the nickel hydrogen battery 8 is composed by parallel connection of four units 8A to 8D. The individual units 8A to 8D may be composed of either single battery modules or series battery modules.

In FIG. 2, high-speed interrupters 21 and 22 are provided as protective circuits in the event of short-circuiting of batteries for composing the units 8A to 8D. The high-speed interrupter 21 is disposed at the feeder line 5 side, and the high-speed interrupter 22 is disposed at the wiring 15 side connected to the return conductor 7, while a reactor 23 is disposed between the nickel hydrogen battery 8 and the high-speed interrupter 21. Thus, by disposing the reactor 23, rising of current at the time of short-circuiting is moderate, and the load applied to high-speed interrupters 21 and 22 may be reduced, and the accidental current can be shut down securely. The reactor 23 may be also disposed between the high-speed interrupter 22 and the nickel hydrogen battery 8.

Incidentally, the high-speed interrupters 21 and 22 and the reactor 23 may be omitted depending on the case. Instead of the high-speed interrupters 21 and 22, a so-called disconnector may be provided. The disconnector has no capacity for interrupting the load current, but is effective when servicing by opening the electric circuit.

2. Characteristic of Nickel Hydrogen Battery

Hereinafter, the characteristic of the nickel hydrogen battery used in the electric railway power-supply system of the preferred embodiment is explained in comparison with other types of secondary battery.

Figure 3:
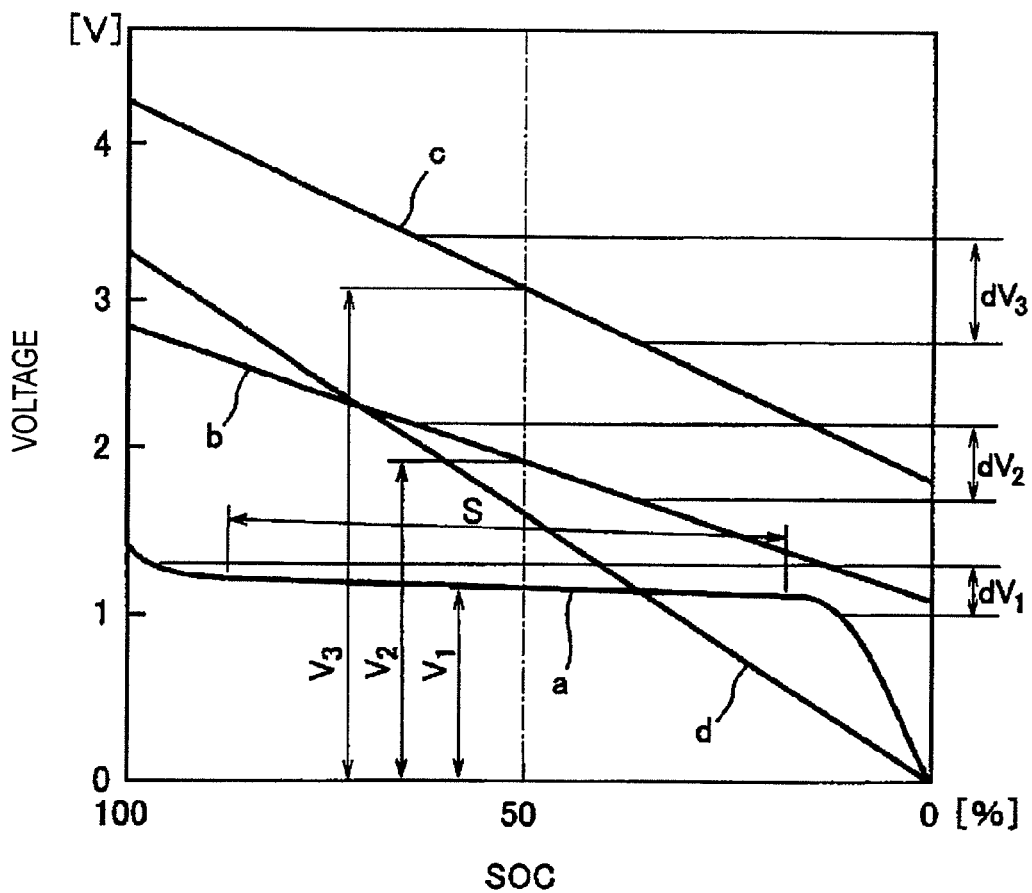
FIG. 3 is a characteristic diagram of SOC (state of charge) showing voltage changes in relation to SOC in various batteries.

FIG. 3 is a characteristic diagram of SOC (state of charge) showing voltage changes in relation to SOC in various batteries. Curve (a) shows the voltage change of nickel hydrogen battery, curve (b) shows the voltage change of lead storage battery, curve (c) shows the voltage change of lithium ion battery, and curve (d) shows the voltage change of electric double layer capacitor.

The voltage change ($\Delta V/\Delta SOC$) in relation to SOC variations is about 0.1 in nickel hydrogen battery, about 1.5 in lead storage battery, about 2 in lithium ion battery, and about 3 in electric double layer capacitor. That is, assuming same voltage changes, the nickel hydrogen battery is smaller in battery capacity than $1/15$ of lead storage battery, $1/20$ of lithium battery, and $1/30$ of electric double layer capacitor. Hence, the battery size can be reduced by the corresponding rate.

As shown in FIG. 3, the nickel hydrogen voltage shown by curve (a) is wider in range S of variations of SOC in relation to voltage variations as compared with other batteries. That is, the nickel hydrogen battery is smaller in variations in battery voltage in relation to variations of SOC. By contrast, in other batteries shown by curves (b), (c), and (d), variations in battery voltage are large in relation to variations of SOC. For example, concerning the median value of SOC, in the nickel hydrogen battery, supposing the voltage of the median value to be V1, when it is used to keep the voltage variations with range dV1, it can be used in almost all of range S of SOC, and the battery capacity can be utilized effectively. By contrast, in the lead storage battery, supposing the voltage of the median value to be V2, when it is used to keep the voltage variations with range dV2, it can be used only in a narrow range of SOC, and the battery capacity cannot be utilized effectively. Similarly, in the lithium ion battery, supposing the voltage of the median value to be V3, when it is used to keep the voltage variations with range dV3, it can be used only in a narrow range of SOC, and the battery capacity cannot be utilized effectively. Herein, the magnitude of voltage variation range is defined as follows: $dV1/V1=dV2/V2=dV3/V3$.

Considering from the viewpoint of voltage variations, when the SOC is in a middle of range S (for example, when the SOC is 40 to 60 percent), by connecting the nickel hydrogen battery 8 directly to the feeder line 5 as shown in FIG. 1, when charging and discharging of the nickel hydrogen battery 8 are repeated, variations of the battery voltage can be suppressed small even if the state of charge is changed. On the other hand, in other batteries (for example, lithium ion battery), variations of battery voltage become large. That is, in the nickel hydrogen battery, the battery capacity can be utilized effectively.

Meanwhile, the variation allowable range of feeder line voltage is in a range of about plus or minus 200 of the nominal target voltage (for example, 750 V or 1500 V).

When the battery is directly coupled to the feeder line, the range capable of charging and discharging within the amount of energy of the entire battery is limited to the range indicated by SOC characteristic in relation to variations of feeder line voltage. That is, the electric power within the battery can be utilized effectively only in the range indicated by SOC characteristic in relation to variations of feeder line voltage.

In the nickel hydrogen battery, since the majority of SOC characteristic can be covered in the variation allowable range of feeder line voltage, the capacity within the battery can be utilized effectively.

As compared with the nickel hydrogen battery, in other secondary batteries, the slope of voltage changes to SOC is large, and the effective battery capacity is relatively small in a range of about plus or minus 20% allowed in the feeder line. In other words, if other batteries than the nickel hydrogen battery, such as lead storage battery and lithium ion battery are used by directly coupling to the feeder line, as compared with the nickel hydrogen battery, a greater number of batteries and a vast area for installation is necessary, and the facility cost is higher.

Figure 4:
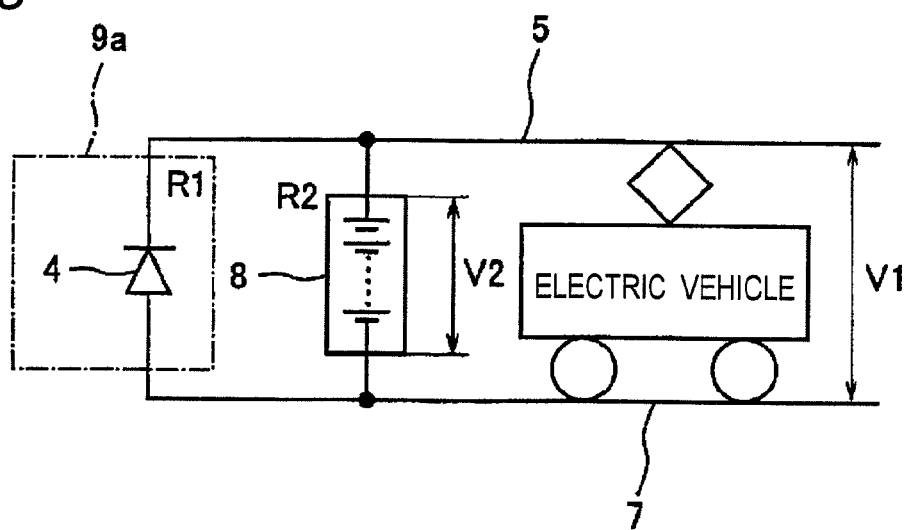
FIG. 4 is a diagram showing the nickel hydrogen battery and a substation portion removing the nickel hydrogen battery extracted from FIG. 1.

FIG. 4 is an extracted diagram showing the nickel hydrogen battery 8 and a substation portion 9a removing the nickel hydrogen battery. That is, the substation 9a and the nickel hydrogen battery 8 are connected in parallel to the electric vehicle which is the load.

Supposing the send-out voltage of the feeder line to be V1, the terminal voltage of the nickel hydrogen battery 8 to be V2, the internal resistance of the nickel hydrogen battery 8 to be R2, and the impedance of the substation 9a to be R1, the current I2 flowing in the nickel hydrogen battery 8 is expressed in the following formula.

$$I2=(V1-V2)/R2$$

Therefore, the smaller the internal resistance of the nickel hydrogen battery 8, the more current flows in the nickel hydrogen battery 8, and the larger is the electric quantity capable of charging and discharging.

For example, in the case of nominal target voltage of feeder line of 750 V, the battery module composed of 30 unit batteries connected in series is connected in series by 20 pieces, and one unit is composed, and one unit is 750 V and 200 Ah, and the internal resistance is 160 to 240 mΩ. When two units are connected in parallel to compose the nickel hydrogen battery 8, the internal resistance is 80 to 120 mΩ, and when four units are connected in parallel to compose the nickel hydrogen battery 8, the internal resistance is 40 to 60 mΩ, and thereby the nickel hydrogen battery 8 of a small internal resistance is composed.

On the other hand, as compared with the nickel hydrogen battery 8, the internal resistance of lead storage battery of the same capacity is about 10 times of the nickel hydrogen battery 8, and the internal resistance of the lithium ion battery of the same capacity is about 2 times of the nickel hydrogen battery 8.

Accordingly, the regenerative current by the electric vehicle is larger in the nickel hydrogen battery as compared with the lead storage battery or the lithium ion battery, and a larger electric quantity is charged in the secondary battery.

When an electric vehicle accelerates, the load current for acceleration of electric vehicle is shared depending on the ratio of the impedance of the substation 9a and the internal resistance of the secondary battery, and hence if the internal resistance of the secondary battery is high, the electric quantity accumulated in the secondary battery cannot be utilized sufficiently. At a substation of 2500 kW class, the impedance is about 0.01Ω, and considering the internal resistance of 0.05Ω of the nickel hydrogen battery, the load-sharing of the substation 9 and the nickel hydrogen battery 8 is about 5:1. In the lead storage battery, on the other hand, since the internal resistance is about 0.5Ω, the load-sharing is about 50:1, and as compared with the nickel hydrogen battery, the lead storage battery cannot utilize sufficiently the electric quantity accumulated in the battery. This is the same in other secondary batteries than the lead storage battery.

Accordingly, the nickel hydrogen battery 8 is smaller in internal resistance as compared with other secondary batteries of same capacity, and therefore a more current flows, and the electric quantity capable of charging and discharging is larger. Indeed, in the case of lead storage battery or lithium ion battery, when a multiplicity of cells are connected in parallel, the internal resistance can be lowered, but a wider area is needed for installation, and the equipment cost is higher.

Thus, from the viewpoint of voltage change to SOC, or from the viewpoint of internal resistance, it is not practical to attempt to couple the lead storage battery or the lithium ion battery directly to the feeder line, because a tremendous number of cells and a wider installation area are needed, and the equipment cost is higher.

To overcome such inconvenience, in other secondary batteries, it is forced to use an expensive charge-discharge control device, that is, a boosting and step-down chopper for controlling the charge voltage in order to utilize a more battery capacity.

3. Demonstration Test Results

In the first preferred embodiment, a demonstration test was conducted on the electric railway power-supply system provided with nickel hydrogen battery. The demonstration test results are shown in FIGS. 5A to 5D.

In this demonstration test, at a certain substation for electric railway in a plural-track district in Japan, the nickel hydrogen battery 8 was directly coupled to the feeder line 5.

In this demonstration test, the voltage specifications of the rectifying device 4 is 750 V, and the specification of the nickel hydrogen battery 8 is 750 V and 800 Ah. The rectifying device 4 and the nickel hydrogen battery 8 are connected to the feeder lines connected to electric car lines for up-vehicle and down-vehicle. Herein, the nickel hydrogen battery 8 is composed, for example, by connecting four units 8A to 8D of 750 V and 200 Ah in parallel as shown in FIG. 2. Each one of units 8A to 8D is composed of 20 battery modules of 37.5 V and 200 Ah connected in series. Each battery module is composed by connecting 30 unit batteries in series. Herein, the battery module is a third structural example shown in FIGS. 12 to 14, but other structural examples may be used.

Figure 5B:
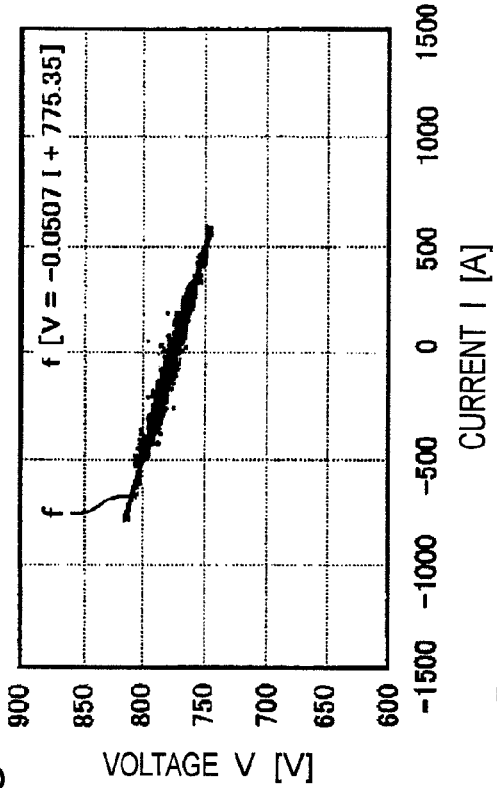
FIGS. 5A to 5D are diagrams showing demonstration test results of the electric railway power-supply system having the nickel hydrogen battery in the first preferred embodiment of the invention.
Figure 5D:
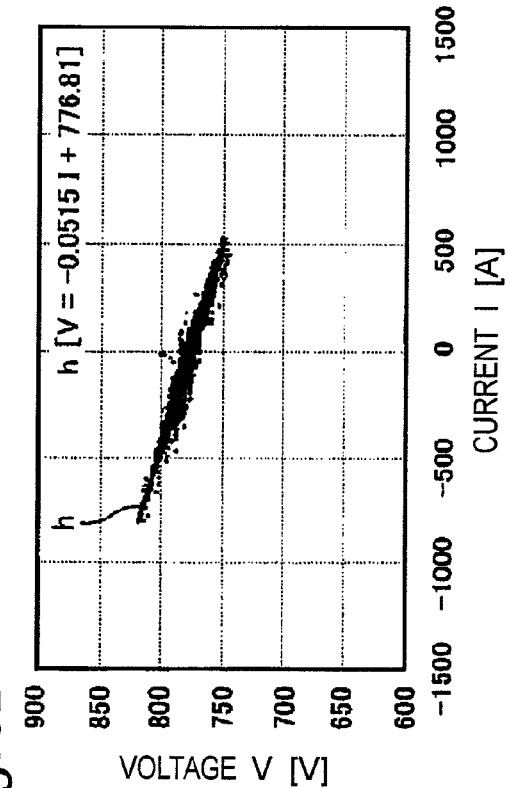
Figure 5A:
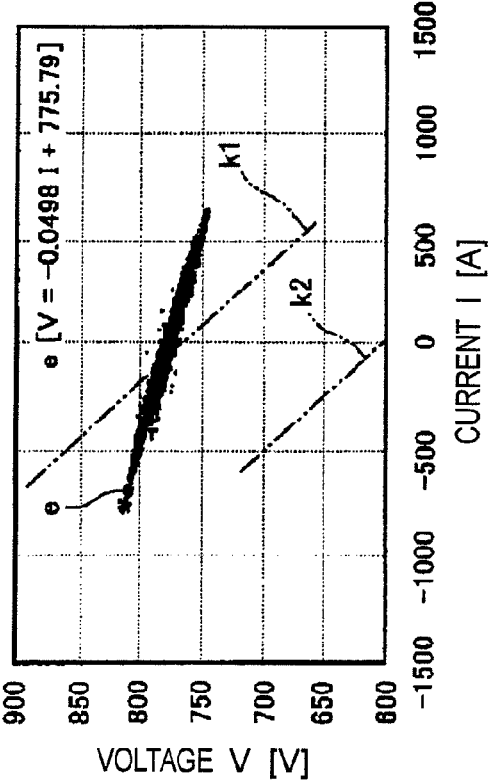
Figure 5C:
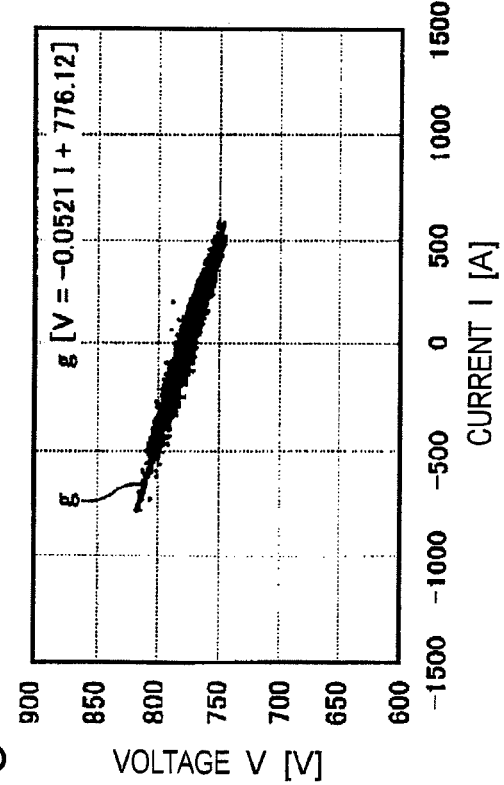

FIG. 5A shows the I-V (current-voltage) characteristic of the nickel hydrogen battery 8 from 10:00 to 11:00 on the day of demonstration test. FIG. 5B shows the I-V characteristic of the nickel hydrogen battery 8 from 11:00 to 12:00 on the day of demonstration test. FIG. 5C shows the I-V characteristic of the nickel hydrogen battery 8 from 12:00 to 13:00 on the day of demonstration test. FIG. 5D shows the I-V characteristic of the nickel hydrogen battery 8 from 13:00 to 14:00 on the day of demonstration test. Herein, a negative current value means charging, and a positive value is discharging.

In FIGS. 5A to 5D, the I-V characteristic is shown in lines (e) to (h), and the lines (e) to (h) are approximately V=−0.05 I+775.

As known from the demonstration test, on lines (e) to (h), the variation of battery voltage is about 1 V, and the internal resistance is about 0.05Ω.

The actual data obtained from the demonstration test is indicated by black spots in FIGS. 5A to 5D. These black spots show that charging and discharging are repeated many times. Thus, when Charging and discharging are repeated, the SOC varies, but the voltage variation can be suppressed on the whole as shown in curve (a) in FIG. 3, since the nickel hydrogen battery is stable in voltage characteristic in a wide range S of SOC, and is small in internal resistance.

For example, when the lead storage battery, instead of the nickel hydrogen battery 8, is directly coupled to the feeder line, since the lead storage battery is large in internal resistance, the I-V characteristic becomes, for example, as shown by chain line k1 in FIG. 5A. When the SOC is further varied, the voltage also changes largely as indicated by curve (b) in FIG. 3, and the I-V characteristic varies from chain line k1 to, for example, chain line k2. Even if the internal resistance can be lowered by connecting a great number of lead storage batteries in parallel, the I-V characteristic varies due to variation of SOC as mentioned above. Therefore, the lead storage battery is not suited to be used as a charge-discharge device.

In the case of lithium battery, too, when the SOC varies, as indicated by curve (c) in FIG. 3, the voltage varies significantly. Therefore, similarly, the lithium ion battery is not suited to be used as charge-discharge device by directly coupling to the feeder line.

As mentioned above, since the nickel hydrogen battery 8 is low in internal resistance and small in voltage variation due to SOC variation, it can be directly coupled to the feeder line 5, and used as a charge-discharge device. In the preferred embodiment, the battery capacity is set so as to be usable in a small range of voltage variation due to SOC variation (for example, range S in FIG. 3).

In the lead storage battery or lithium ion battery, when the capacity is increased extremely so as to be coupled directly to the feeder line, a very vast area is needed for installation, and the cost is very increased, thus it is not suited to practical use.

The nickel hydrogen battery 8 is small in internal resistance, and is also small in voltage variation due to SOC variation. Therefore, when the electric vehicle accelerates and a large current is needed instantly and the nickel hydrogen battery discharges, drop of voltage is suppressed. To the contrary, when the electric vehicle regenerates and a large current is generated instantly and the nickel hydrogen battery charges, elevation of voltage can be suppressed. In this manner, the electric railway power-supply system provided with the nickel hydrogen battery is capable of stabilizing the feeder line voltage. These advantages could be confirmed by the demonstration test described above.

4. Structural Examples of Battery Module

Hereinafter, this is to explain structural examples of battery module for composing the nickel hydrogen battery 8 used in the first preferred embodiment. The following structural examples of the battery module may be similarly applied to the nickel hydrogen battery of the electric railway power-supply system in a second preferred embodiment of the invention to be described later.

4.1 First Structural Example

Figure 6A:
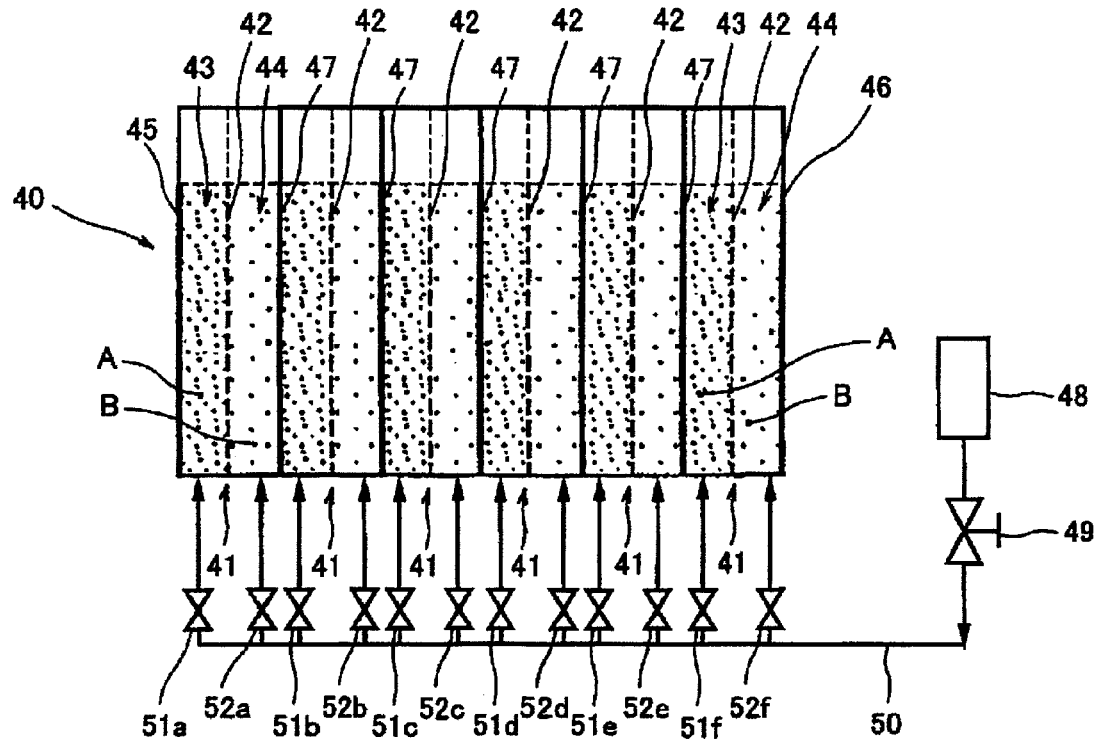
FIG. 6A is an outline sectional structural diagram of a battery module in a first structural example.
Figure 6B:
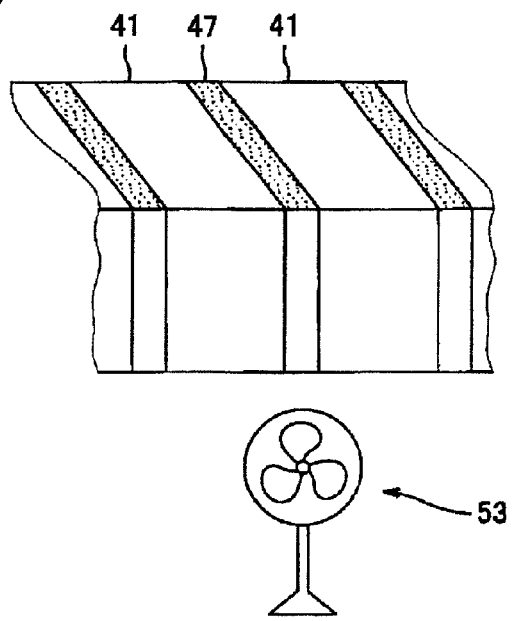
FIG. 6B is a perspective view showing a part of the battery module.

FIG. 6A is an outline sectional structural diagram of the battery module in the first structural example, and FIG. 6B is a perspective view showing a part of the battery module.

This battery module 40 has a structure in which six unit batteries 41 connected in series, for example, as shown in FIG. 6A. Each unit battery 41 has its intermediate part made of polypropylene fiber nonwoven cloth capable of permeating ions but not permeating electrons, and has a positive electrode cell 43 and a negative electrode cell 44 partitioned by a hydrophobic separator 42 not processed by hydrophilic treatment. The left end wall of the positive electrode cell 43 of the unit battery 41 at the left end functions as a positive electrode current collector 45, and the right end wall of the negative electrode cell 44 of the unit battery 41 at the right end functions as a negative electrode current collector 46. The right side wall of the negative electrode cell 44 of the unit battery 41 at the left end, and the left side wall of the positive electrode cell 43 of the unit battery 41 at the right end are composed of current collector members 47 functioning also as dividing walls. Also between four unit batteries 41 positioned in the middle, current collector members 47 functioning as dividing walls are disposed. Thus, from the unit battery 41 at the left end to the unit battery 41 at the right end, the batteries are connected in series by way of the current collector members 47. The positive electrode cell 43 and the negative electrode cell 44 are filled with a KOH aqueous solution as a common electrolyte solution. Nickel hydroxide powder A is mixed in the KOH aqueous solution of the positive electrode cell 43, and hydrogen occlusion alloy powder B is mixed in the KOH aqueous solution of the negative electrode cell 44.

The material of the current collector members may include nickel metal plate, nickel metal foil, carbon plate, nickel plated iron, nickel plated stainless steel, or nickel plated carbon, and any other material may be used as far as it is not corroded or degenerated in an alkaline electrolyte solution, and is ion non-permeable, and conductive electrically.

As stated above, the negative electrode cell 44 is filled with an electrolyte solution mixed with hydrogen occlusion alloy powder B as powder active material of negative electrode, and the positive electrode cell 43 is filled with an electrolyte solution mixed with nickel hydroxide powder A as powder active material of positive electrode. At this time, since the separator 42 is hydrophobic, when the negative electrode cell 44 and the positive electrode cell 43 are filled with an electrolyte solution, the inside of the battery is evacuated (to an internal pressure of about 1000 Pa or less), and the electrolyte solution is pushed in by force.

The combination of powder active materials of the negative electrode and the positive electrode is, for example, a combination of hydrogen occlusion ally and nickel hydroxide. An example of the hydrogen occlusion alloy is La0.3 (Ce, Nd)0.15 Zr0.05 Ni3.8 Cu0.8 Al0.5.

As the electrolyte solution, for example, KOH aqueous solution, NaOH aqueous solution, or LiOH aqueous solution may be used.

The separator 42 is made of a hydrophobic material not processed by hydrophilic treatment. Since the separator 42 is always used in a condition contacting with an alkaline electrolyte solution, and the hydrophobic material to be used in the separator 42 is desired to be excellent in chemical resistance. For example, polyethylene fiber, polypropylene fiber, other polyolefin fiber, polyphenyl sulfide fiber, polyfluoroethylene fiber, and polyamide fiber are excellent in chemical resistance, and may be preferably used as the separator 42. From these fibers, for example, woven fabric, knit fabric, nonwoven fabric, yarn lace, flat plaited fabric, and other textile sheets may be formed. Among them, the woven fabric and the nonwoven fabric are high in tensile strength, and excellent in shape stability, and resistant to breakage during battery assembling process, and are hence preferable. The woven fabric may be formed by plain weaving, satin weaving, or twill weaving. The nonwoven fabric may be obtained by using a fiber web formed by, for example, card method, air-lay method, spun-bond method, or melt-blow method, and bonding by needle punch or water stream, heat treatment of fiber web containing heat-fusible fiber, fusing method by heat treatment and pressurizing process, or adhering method of fiber web by using an adhesive agent. The woven fabric and the nonwoven fabric may also be formed by other methods.

In the battery module of the first structural example shown in FIG. 6A, from a hydrogen cylinder 48 packed with oxygen gas at high pressure, oxygen gas can be supplied into the positive electrode cell 43 and the negative electrode cell 44 of each unit battery 41 by a pressure regulating valve 49, by way of a route 50. That is, by way of the route 50, by opening and closing valves 51a, 51b, 51c, 51d, 51e, and 51f provided in each branch passage leading to six positive electrode cells 43, and valves 52a, 52b, 52c, 52d, 52e, and 52f provided in each branch passage leading to six negative electrode cells 44, oxygen gas can be supplied in both positive electrode cells 43 and negative electrode cells 44, or in positive electrode cells 43 only or in negative electrode cells 44 only, so that the oxygen gas and an excess hydrogen gas remaining in the negative electrode cells 44 can be reacted and converted into water. That is, the oxygen gas supplied in the negative electrode cells 44 reacts with an excess hydrogen gas remaining in the negative electrode cells 44, and is converted into water, and the oxygen gas supplied in the positive electrode cells 43 passes through the separator 42, and reacts with an excess hydrogen gas remaining in the negative electrode cells 44, and is converted into water.

In the module of closed type nickel hydrogen battery having the configuration as shown in FIG. 6A, from the hydrogen cylinder 48 packed with oxygen gas at high pressure (20 kg/cm$^2$), oxygen gas at 2 kg/cm$^2$ was supplied through the pressure regulating valve 49 into both positive electrode cells 43 and negative electrode cells 44 of six unit batteries 41, and an experiment was conducted to evaluate the suppressing effect of elevation of internal pressure in the negative electrode cells 44, and the operation is explained below.

In the experiment, the positive electrode current collector 45 and the negative electrode current collector 46 were connected to an incandescent lamp, which is a load not shown in the drawing, and in one hour after starting discharging, the internal pressure of each negative electrode cell 44 of the six unit batteries 41 was elevated to 1 MPa. Herein, the volume of the blank portion not containing the electrolyte solution in each negative electrode cell 44 was 0.0012 m$^3$.

At this time, oxygen gas at 2 kg/cm$^2$ was supplied from the oxygen cylinder 48 into both positive electrode cells 43 and negative electrode cells 44 of six unit batteries 41 by way of the pressure regulating valve 49, and one hour later, the internal pressure of each negative electrode cell 44 of the six unit batteries 41 was lowered to 0.1 MPa.

Meanwhile, battery manufacturers generally face problems of solving the heat generation caused by battery reaction. In particular, in a battery of closed structure, the problem of heat generation is very serious, and a battery of closed structure is desired to have a proper heat transfer structure.

In the conventional cylindrical battery or square battery, since the outside of the battery case is cooled, it is difficult to expect a desired cooling effect if the nickel hydrogen battery is built in a structure of cylindrical battery or square battery. More specifically, in either cylindrical battery or square battery, it is designed to transfer heat in a direction at right angle to the direction of arrangement of separator and active material, for example, in a direction of radius, in a case of a circular columnar battery, and in other words, it is designed to transfer heat to outside by way of laminated separators and active materials.

Figure 7:
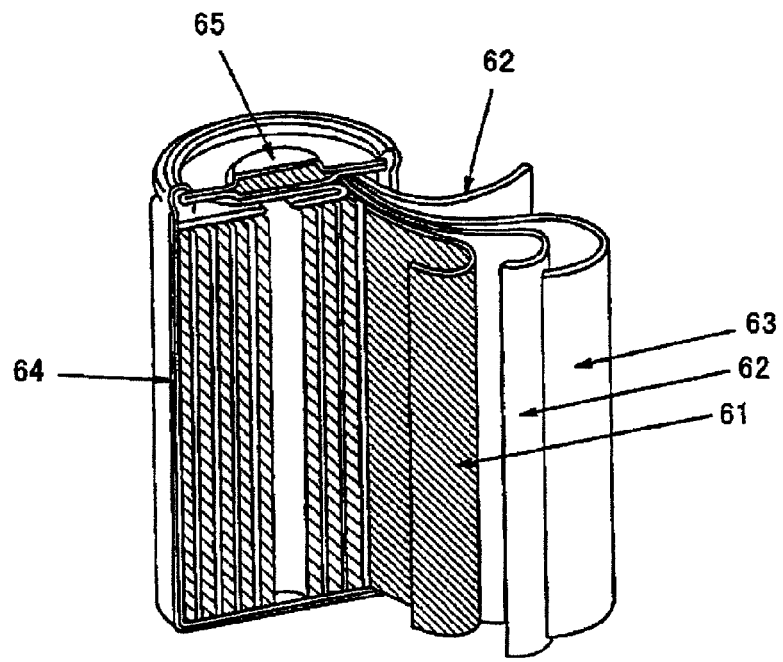
FIG. 7 is an outline perspective view showing a partially cut-away view of a cylindrical battery.
Figure 8:
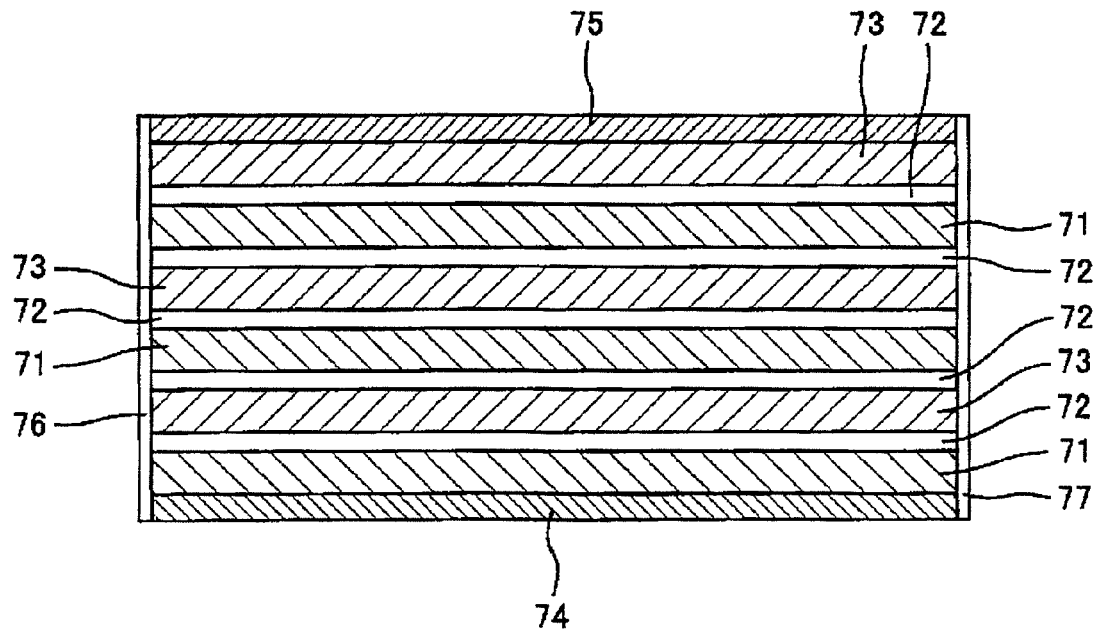
FIG. 8 is an outline sectional structural view of a square battery.

FIG. 7 is a diagram showing an example of a cylindrical battery. As shown in FIG. 7, a positive electrode active material sheet 61, an ion permeable separator 62, a negative electrode active sheet 63, and an ion permeable separator 62 are sequentially stacked up, and taken up spirally, and a cylindrical battery is composed. In this cylindrical battery, a case 64 is a negative electrode terminal, and a cap 65 is a positive electrode terminal. FIG. 8 is a diagram showing an example of a square battery. As shown in FIG. 8, a positive electrode active material sheet 71, an ion permeable separator 72, a negative electrode active sheet 73, and an ion permeable separator 72 are sequentially stacked up, and a square battery is composed. In this square battery, one end wall 74 is a positive electrode terminal, and other end wall 75 is a negative electrode terminal. Side walls 76 and 77 are insulators.

In the structure shown in FIG. 7, it is necessary to transfer heat in a direction at right angle (radial direction) to the direction of arrangement of active material sheets and separators (circumferential direction), but it is difficult to achieve heat conduction favorably through multiple layers of stacked materials, and to the contrary, these layers seem to play a role of a heat insulating material. In particular, fibers of low heat conductivity or porous plastic materials are stacked up the separator, and the heat conductivity is particularly lowered. Similarly, in the structure shown in FIG. 8, it is necessary to transfer heat in a direction at right angle to the direction of arrangement of active material sheets and separators (horizontal direction), but it is difficult to achieve heat conduction favorably through multiple layers of stacked materials, and to the contrary, these layers seem to play a role of a heat insulating material.

What is more, as the battery size increases, the heat transfer area increases only in proportion to (2/3) power of the capacity, and the heat transfer distance becomes longer. As a result, in the battery shown in FIG. 7 and FIG. 8, if the outside of the case is cooled, the inside of the battery is not cooled to a desired temperature.

Accordingly, in the battery structure shown in FIG. 6A, the structure of the current collector member 47 serving also as the dividing wall may be formed, for example, as a porous material to increase the heat transfer area, and this porous current collector member 47 may also play the role of heat transfer member, and the heat generated by battery reaction may be sufficiently released from this current collector member. As a result, the deterioration of the battery may be suppressed. On the other hand, aside from using the current collector member 47 as heat releasing material, it can be also used as heat reserve member. That is, if the heat generated by battery reaction is accumulated in the battery of closed structure, deterioration of battery is promoted, and it is not desired; but on the other hand, for smooth execution of the battery reaction, it is desired that the battery component materials be in a certain temperature range (about 25° C. to 50° C.). Hence, instead of releasing heat by force from the porous current collector member 47, as the case may be, in order to keep the battery component materials above a certain temperature, for example, about 25° C. or higher, a heat insulating material may be adhered to the outside of a part of the porous current collector member 47 so as to suppress heat release. Similarly, in a structure for cooling the heat release plate by force by using a fan, if the battery component materials are lower than a specific temperature, heat release can be suppressed by not operating the fan.

As the battery is increased in size, the surface area increases, and only cooling the surface may be often insufficient to cool the inside of the battery. Accordingly, as shown in FIG. 6A, when the battery is composed by stacking up a plurality of unit batteries, by cooling the current collector member 47, that is, the dividing wall for participating the unit batteries, it seems effective to cool the inside of the battery effectively. The current collector member 47 as the dividing wall is excellent in conductivity, and as shown in FIG. 6B, the current collector member 47 composed of porous aluminum plates, and the unit batteries 41 having positive electrode cells and negative electrode cells partitioned by the separator are connected densely. Accordingly, by way of the current collector member 47, not only the electron but also the heat can be transmitted efficiently.

An experiment of installing the fan 53 at a lower position in order to supply the cooling air to release heat effectively by the current collector member 47 effectively was conducted with a nickel hydrogen battery module in the configuration as shown in FIG. 6A (see FIG. 6B). First, in a stopped state of the fan 53, when overcharged by 120% at room temperature, the thermometer installed inside the battery showed a temperature increased to about 100° C. in two hours.

Accordingly, the fan 53 was started, and cool air was supplied toward the battery module composed of six unit batteries, and two hours later after 120% overcharging, the thermometer installed in the battery showed a temperature increased only about 10° C. from the room temperature (25° C.).

As the current collector member 47, instead of using porous aluminum plates, for example, aluminum plates or other metal plates having a multiplicity of communication holes for passing a refrigerant in the vertical direction may be used.

In this battery module 40, for example, in the middle of the positive electrode current collector 45, a positive electrode terminal for external connection similar to a positive electrode terminal 94 shown later in FIG. 10 may be connected, and in the middle of the negative electrode current collector 106, a negative electrode terminal for external connection similar to a negative electrode terminal 95 shown later in FIG. 10 may be provided.

4.2 Second Structural Example

Figure 9:
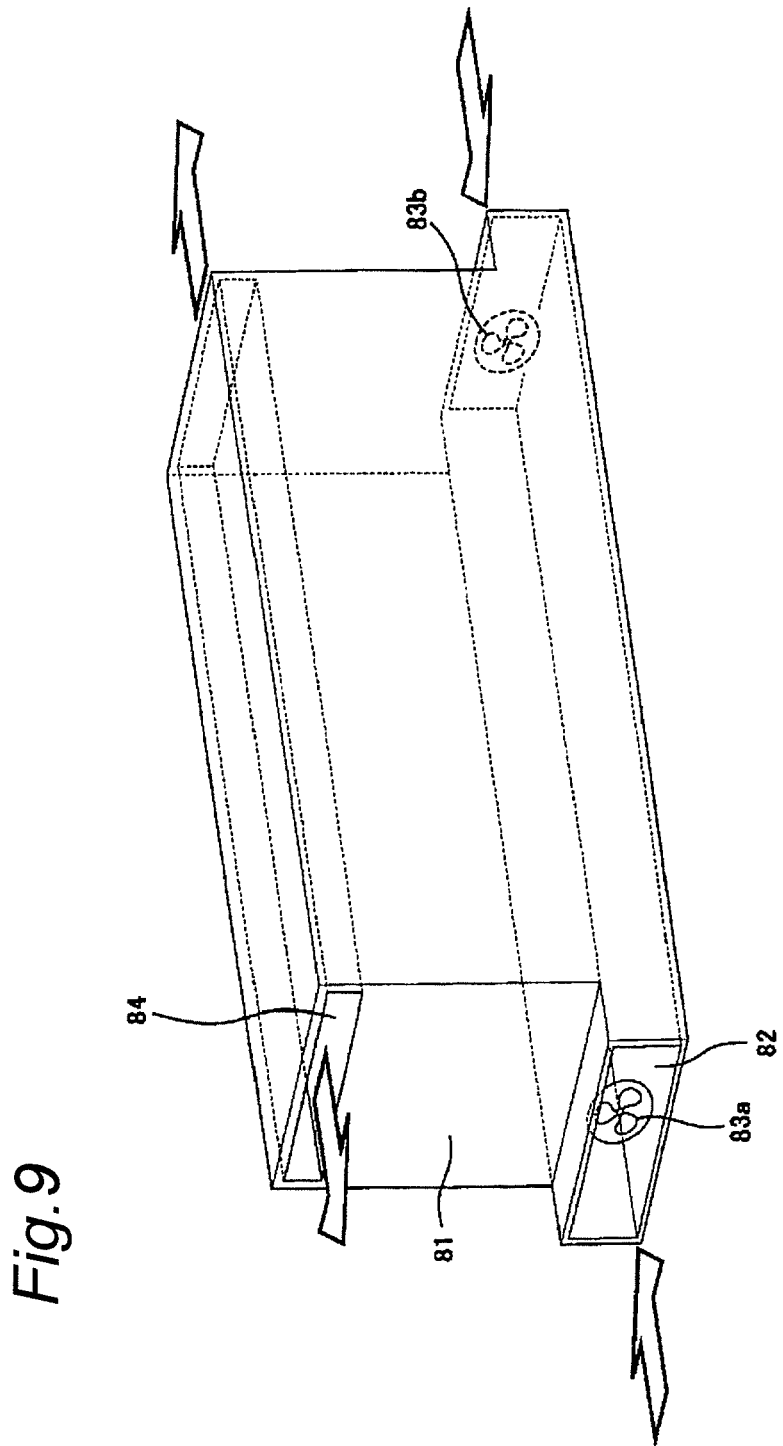
FIG. 9 is a perspective view showing a configuration of cooling of a battery module in a second structural example, by a forced-cooling fan and a wind tunnel.

FIG. 9 is a perspective view showing a configuration of cooling of a battery module 81 in a second structural example, by a forced-cooling fan and a wind tunnel (air passage space). The battery module 81 has an air communication space 82 for passing air in the lower part thereof. The air sucked in by the intake fan 83a and the intake fan 83b is released to outside by way of the air communication space 82 in the lower part, the heat transfer space in the battery module 81, and an air communication space 84 in the upper part. The arrows in FIG. 9 show the air flowing directions.

Figure 10A:
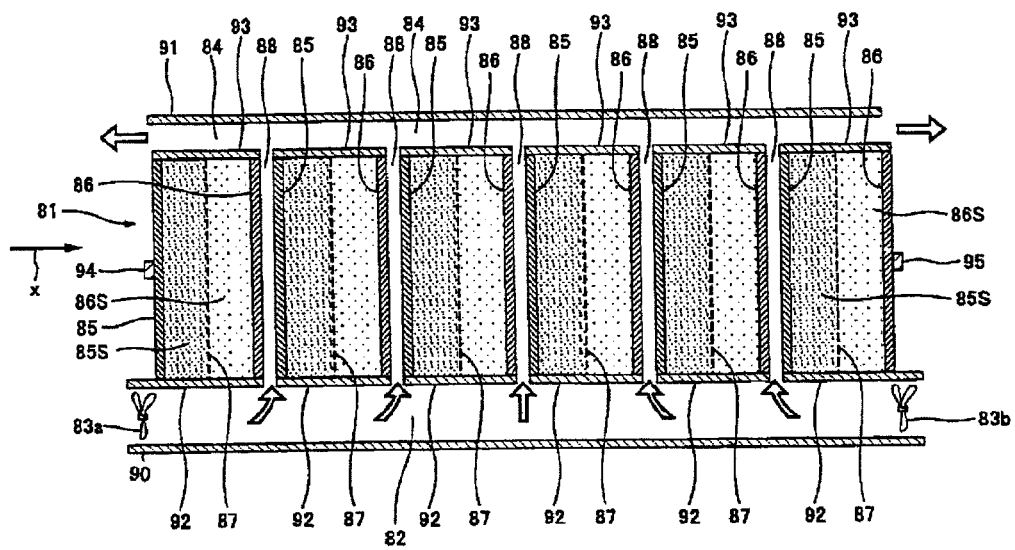
FIG. 10A is a longitudinal sectional view of the battery module in the second structural example.
Figure 10B:
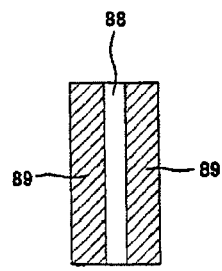
FIG. 10B is a sectional view showing a conductive member disposed between a positive electrode plate and a negative electrode plate of the battery module.
Figure 10C:
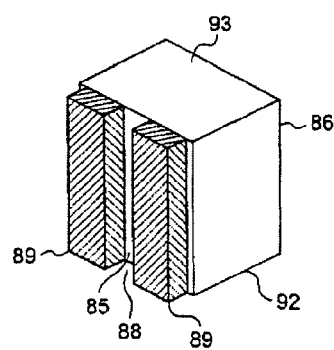
FIG. 10C is a perspective view of a conductive member disposed outside of the positive electrode plate of a unit battery.

FIG. 10A is a longitudinal sectional view of the battery module in the second structural example. FIG. 10B is a cross-sectional view of a conductive member positioned between the positive electrode plate and the negative electrode plate of the battery modules as seen from the direction of arrow x in FIG. 10A. FIG. 10C is a perspective view of a conductive member disposed outside of the positive electrode plate of the unit battery for composing the battery module in the second structural example (to be explained below). In FIG. 10A, other arrows than arrow x show the air flowing directions.

This battery module 81, for example, is composed by stacking up six unit batteries. Each unit battery is packed with an electrolyte solution between the positive electrode plate 85 as the positive electrode current collector and the negative electrode plate 86 as the negative electrode current collector, and between the positive electrode cell 85S and the negative electrode cell 86S, a separator 87 not corroded or degenerated in alkaline electrolyte solution and passing ions but not passing electrons is interposed, and a positive electrode active material is installed in the positive electrode cell 85S, and a negative electrode active material is installed in the negative electrode cell 86S. Between the two mutually adjacent unit batteries, an air communication passage 88 is provided for passing the air sucked from the intake fan 83a and the intake fan 83b in the vertical direction.

The air communication passage 88 is not provided on the entire surface confronting the positive electrode plate 85 and the negative electrode plate 86, but is provided in the vertical direction in the middle portion of the positive electrode plate 85 and the negative electrode plate 86 as shown in FIG. 10B and FIG. 10C. At both sides of the air communication passage 88, conductive members 89 are disposed, and the positive electrode plate 85 and the negative electrode plate 86 are connected by means of the conductive members 89.

For the separator 87, for example, a woven fabric or non-woven fabric of ethylene tetrafluoride resin, polyethylene, nylon or polypropylene, or a membrane filter may be used. For the conductive member 89, nickel plated aluminum plate or other nickel metal plated, nickel metal foil, carbon plate, nickel plated iron, nickel plated stainless steel, nickel plated carbon, or similar material, and any other material not corroded or degenerated in alkaline electrolyte solution, and not passing ions, and having an electric conductivity may be used.

Each unit battery is enclosed by insulator plates 93 and 92 at above and below. The air communication spaces 82 and 84, in the lower part and the upper part, are respectively enclosed by insulator plates 90 and 91 at below and above. Further, as shown in FIG. 10, in the middle portion of the positive electrode plate 85 at the left end, a positive electrode terminal 94 for external connection is provided. In the middle portion of the negative electrode plate 86 at the right end shown in FIG. 10, a negative electrode terminal 95 for external connection is provided.

In FIG. 10A, instead of the battery module 81, the battery module 40 having the porous current collector member 47 shown in FIG. 6 may also be used.

Figure 11:
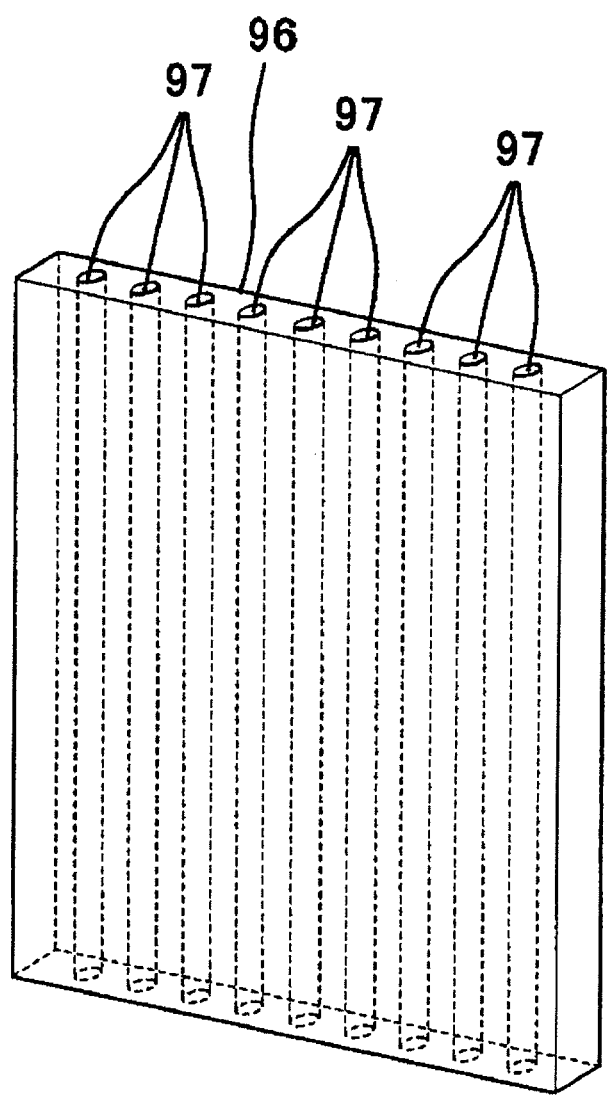
FIG. 11 is a perspective view of a heat transfer plate.

Instead of the conductive member 89 provided with the air communication passage 88, a heat transfer plate 96 shown in FIG. 11 may be used. The heat transfer plate 96 is made of aluminum and plated with nickel, and a multiplicity of air communication passages 97 are provided in the vertical direction. The heat transfer plate 96 may be used instead of the conductive member 89, and may be inserted between the positive electrode plate 85 and the negative electrode plate 86, so that the air sucked in from the intake fan 83a and the intake fan 83b may be passes through the communication passage 97. The heat transfer plate 96 also serves as a member contacting with the positive electrode plate 85 and the negative electrode plate 86, for connecting the positive electrode plate 85 and the negative electrode plate 86 electrically, and it has electrical conductivity. In this respect, aluminum is relatively low in electric resistance and is relatively high in heat conductivity, and is preferable as a material for the heat transfer plate 96, but it is likely to oxidize. When the aluminum plate is plated with nickel, oxidation is suppressed, and the contact resistance is also lowered, and hence it is further preferable as a material for the heat transfer plate 96.

4.3 Third Structural Example

Figure 12:
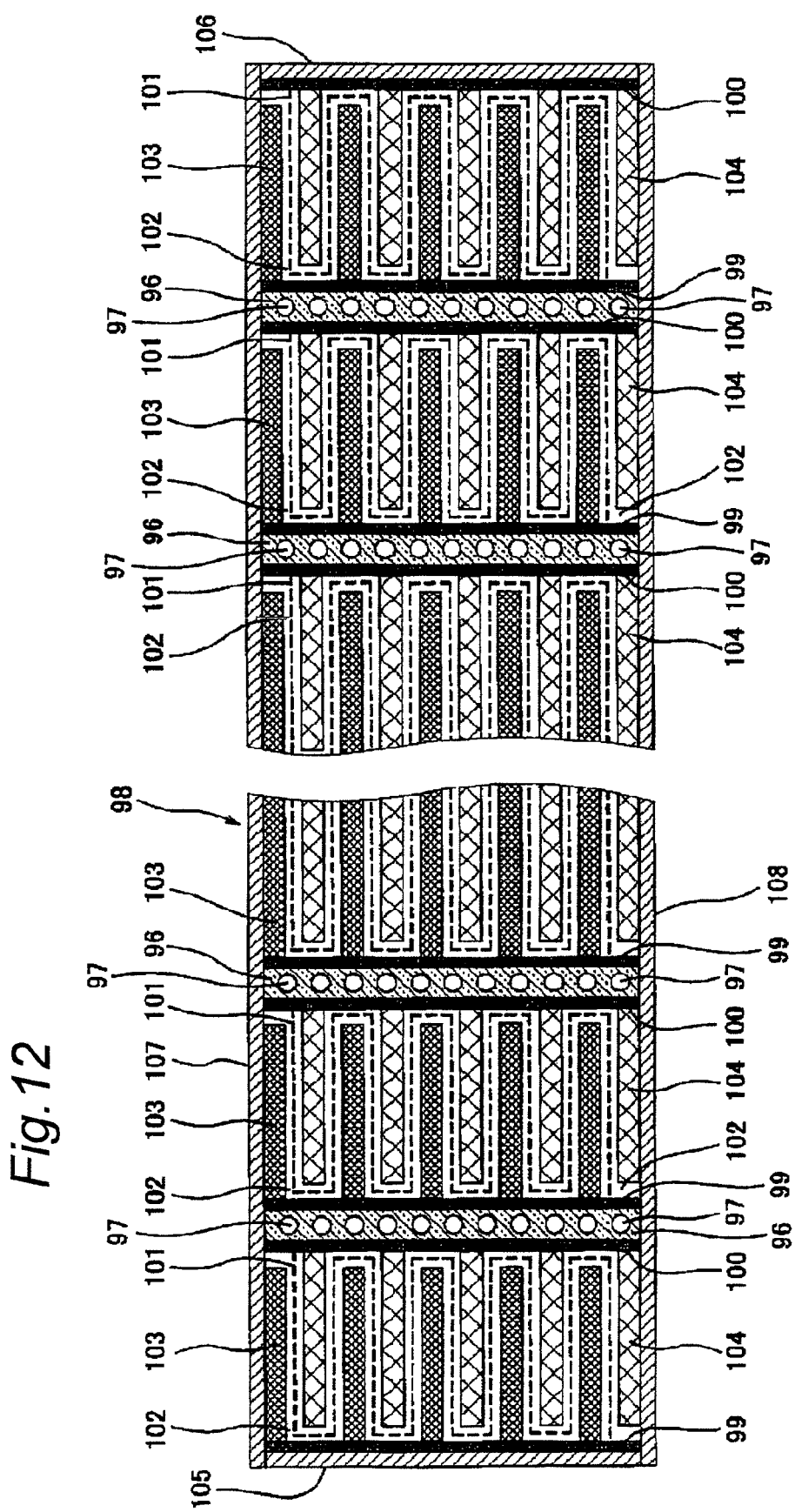
FIG. 12 is a lateral sectional view of a battery module in a third structural example.
Figure 13:
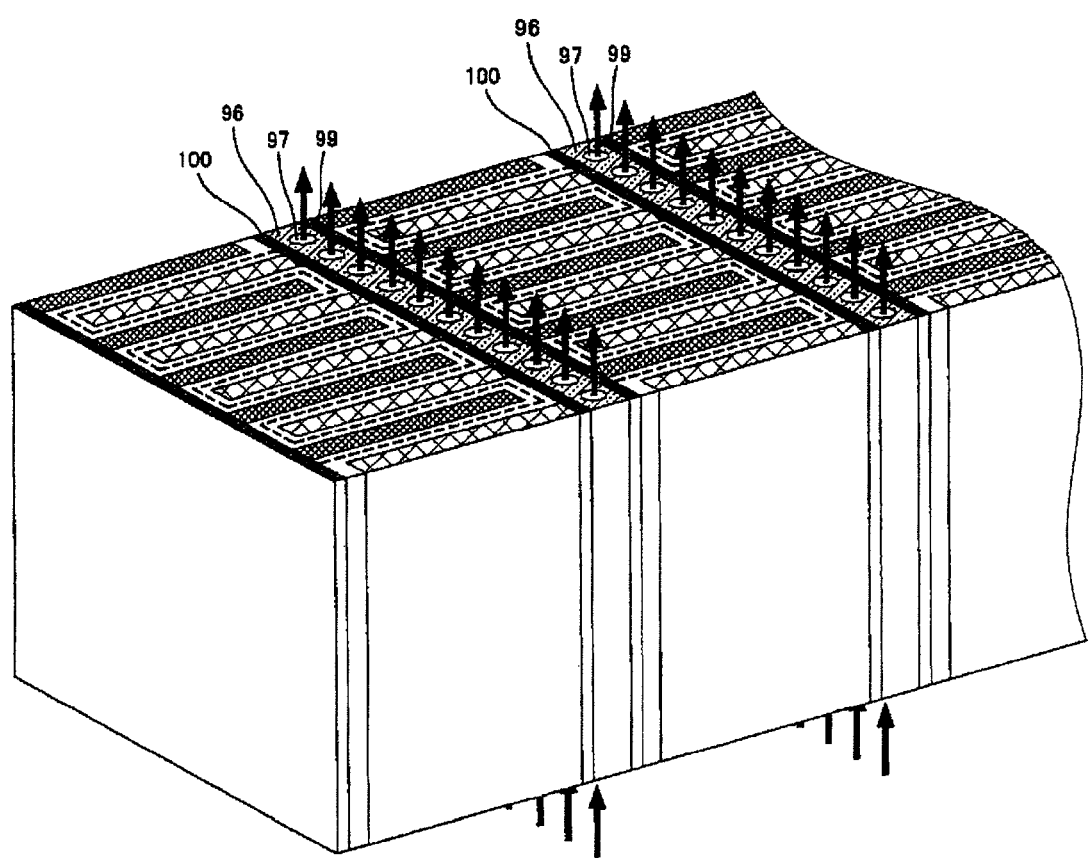
FIG. 13 is a diagram showing an air flow direction in the heat transfer plate in the battery module in FIG. 12.
Figure 14:
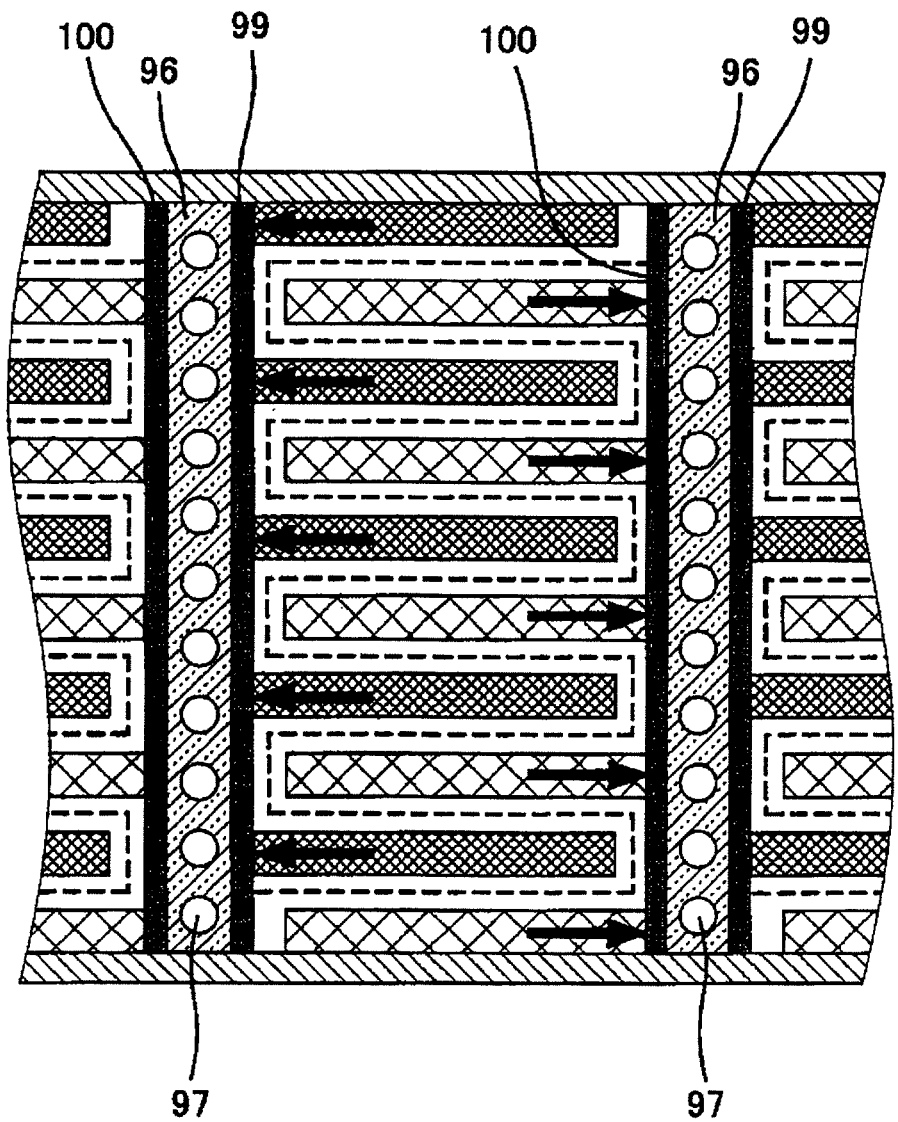
FIG. 14 is a diagram showing a heat transmission direction in the battery module in FIG. 12.

FIG. 12 is a cross-sectional view of a battery module in a third structural example. FIG. 13 is a diagram showing air flowing directions in a heat transfer plate in the battery module in FIG. 12, and insulator plates 107 and 108 shown in FIG. 12 are omitted. FIG. 14 is a diagram showing heat transmission directions in the battery module in FIG. 12.

The battery module 98 is composed by stacking up a plurality of unit batteries. In each unit battery, between mutually opposing positioned positive electrode current collector 99 and negative electrode current collector 100, bellows-like separators 101 not corroded or degenerated in an alkaline electrolyte solution, and passing ions and not passing electrons are disposed alternately and adjacently to both current collectors. Further, in each unit battery, in the space divided by the bellows-like separators 101 and the positive electrode current collector 99, a positive electrode sheet 103 containing an electrolyte solution 102 and a positive electrode active material is disposed, and in the space divided by the bellows-like separators 101 and the negative electrode current collector 100, a negative electrode sheet 104 containing an electrolyte solution 102 and a negative electrode active material is disposed, and the positive electrode sheet 103 and the negative electrode sheet 104 are mutually assembled at both sides of the separators 101. The positive electrode sheet 103 contacts with the positive electrode current collector 99, and the negative electrode sheet 104 contacts with the negative electrode current collector 100. Between the two mutually adjacent unit batteries, the heat transfer plate 96 shown in FIG. 11 is inserted so as to contact with the positive electrode current collector 99 of one unit battery, and the negative electrode current collector 100 of the other unit battery. The direction of the air communication passage 97 of this heat transfer plate 96 coincides with the vertical direction of the positive electrode sheet 103 and the negative electrode sheet 104. Between the positive electrode current collector 99 and the negative electrode current collector 100, the space is divided into a positive electrode cell and a negative electrode cell by the separator 101, and the region divided by the separator 101 and the positive electrode current collector 99 and having the positive electrode sheet 103 is the positive electrode cell, and the region divided by the separator 101 and the negative electrode current collector 100 and having the negative electrode sheet 104 is the negative electrode cell.

For example, in FIG. 9, instead of the battery module 81 in the second structural example, using the battery module 98 of this structural example, can cool the battery module 98.

As shown in FIG. 12, the positive electrode current collector 99 and the negative electrode current collector 100 composed of the metal having excellent electric conductivity and heat conductivity respectively contact directly with the positive electrode sheet 103 and the negative electrode sheet 104, and the current collectors 99 and 100 contact with the heat transfer plate 96, which plays the role of linking the positive electrode current collector 99 and the negative electrode current collector 100 electrically. Accordingly, while the air passes through the air communication passage 97 of the heat transfer plate 96 along the direction shown by the arrows in FIG. 13, the heat generated as a result of battery reaction is efficiently transmitted along the directions indicated by the arrows in FIG. 14 and is released to outside. In this manner, the temperature in the battery module 98 is maintained in a proper range so that the battery reaction may be executed smoothly.

As shown in FIG. 12, a unifying positive electrode current collector 105 is provided at the end portion of the positive electrode, and a unifying negative electrode current collector 106 is provided at the end portion of the negative electrode. At the side portion of the battery module 98, insulator plates 107 and 108 are provided. In the middle portion of the unifying positive electrode current collector 105, a positive electrode terminal similar to the positive electrode terminal 94, for example, shown in FIG. 10 is provided, and in the middle portion of the unifying negative electrode current collector 106, a negative electrode terminal similar to the negative electrode terminal 95, for example, shown in FIG. 10 is provided.

The positive electrode sheet 103 is formed, for example, by adding a solvent to a positive electrode active material; a conductive filler, and a resin to make a paste composition, applying on a substrate to form into a plate, and hardening. The negative electrode sheet 104 is formed, for example, by adding a solvent to a negative electrode active material, a conductive filler, and a resin to make a paste composition, applying on a substrate to form into a plate, and hardening. For the positive electrode active material, the negative electrode active material, or any known active material may be used. For the conductive filler, carbon fiber, nickel plated carbon fiber, carbon particle, nickel plated carbon particle, nickel plated organic fiber, fibrous nickel, nickel particle, or nickel foil may be used either alone or in combination. For the resin, a thermoplastic resin of softening temperature of up to 120° C., a resin of curing temperature of ordinary temperature to 120° C., a resin dissolved in a solvent of evaporation temperature of 120° C. or less, a resin dissolved in a solvent soluble in water, or a resin dissolved in a solvent soluble in alcohol may be used. For the substrate, a nickel plate or other electrically conductive metal plate may be used.

5. Example of Durability Enhancement of Battery

By adding a capacitor component to the battery, and charging and discharging at a high speed and in a short time by this capacitor component, the shortage may be covered by the battery, and consequently the battery durability can be enhanced. More specifically, since the internal resistance of the capacitor component is smaller than the internal resistance of the battery, when charged and discharged at a high speed and in a short time, the capacitor component mainly charges and discharges, and the battery hardly charges and discharges. To obtain this effect, a material of a large capacitor capacity is inserted between the separator and the positive electrode active material and between the separator and the negative electrode material. For example, the unit battery may be composed in a configuration as shown in FIG. 15.

Figure 15:
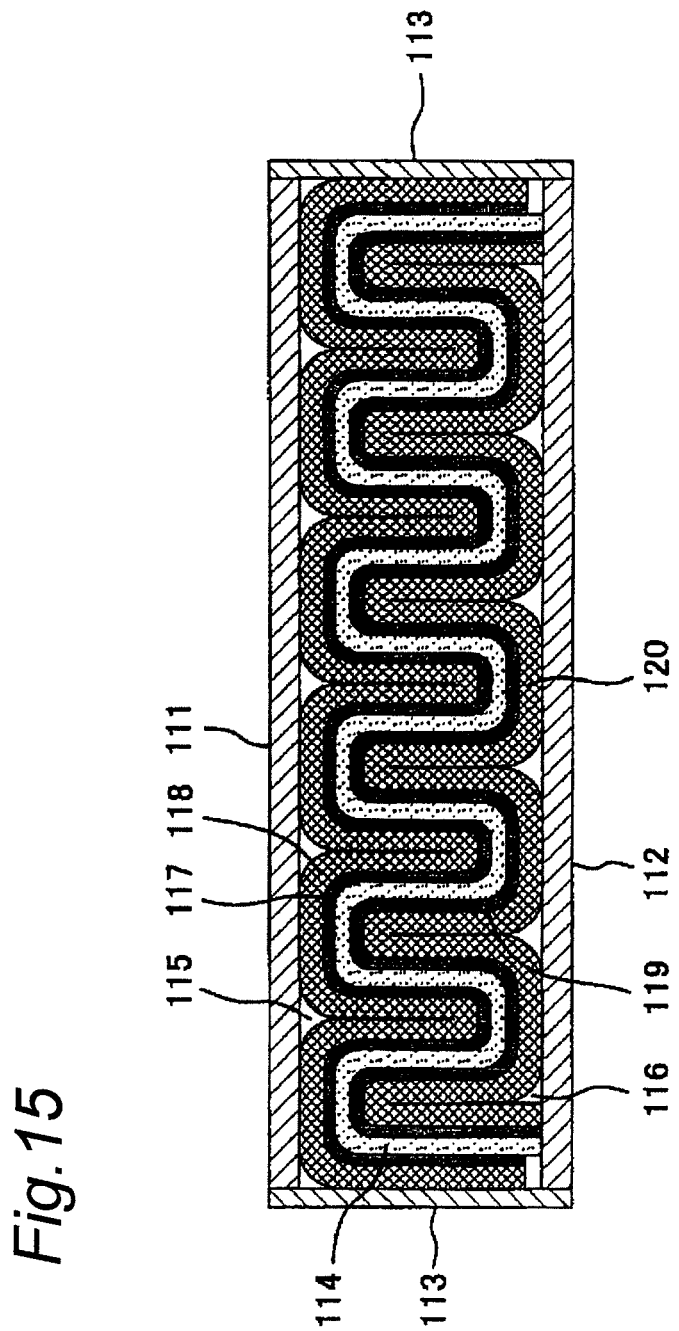
FIG. 15 is an outline sectional structural diagram of a unit battery enhanced in durability.

Of the unit battery shown in FIG. 15, the positive electrode side is surrounded by a positive electrode current collector 111, the negative electrode side is surrounded by a negative electrode current collector 112, and the side portion is surrounded by an insulator 113. The inside of the cell surrounded by them is fully packed with an electrolyte solution. The cell is separated into a positive electrode cell 115 and a negative electrode cell 116, by an ion permeable bellows-like separator 114 not corroded or degenerated in an alkaline electrolyte solution, and not passing electrons but passing ions. In the inside of the positive electrode cell 115, a bellows-like nonwoven cloth 117 of polypropylene fibers containing a positive electrode active material entirely contacting with the separator 114 is disposed, and further a bellows-like molded body 118 of nickel foam containing a positive electrode active material entirely contacting with the nonwoven cloth 117 and partially contacting with the positive electrode current collector 111 is disposed. In the inside of the negative electrode cell 116, a bellows-like nonwoven cloth 119 of polypropylene fibers containing a negative electrode active material entirely contacting with the separator 114 is disposed, and further a bellows-like molded body 120 of nickel foam containing a negative electrode active material entirely contacting with the nonwoven cloth 119 and partially contacting with the negative electrode active material 112 is disposed. In the configuration shown in FIG. 15, the bellows-like nonwoven cloth 117 of polypropylene fibers and the bellows-like nonwoven cloth 119 of polypropylene fibers correspond to the capacitor components.

In the closed type battery having the configuration as shown in FIG. 15, when the bellows-like nonwoven cloth 117 of polypropylene fibers and the bellows-like nonwoven cloth 119 of polypropylene fibers were eliminated as shown in FIG. 15, the cycle life was 4,000 cycles, but when the bellows-like nonwoven cloth 117 of polypropylene fibers and the bellows-like nonwoven cloth 119 of polypropylene fibers were contained, the cycle life was more than 10,000 cycles.

A battery module can be constructed by stacking up a plurality of the unit batteries having the configuration as shown in FIG. 15. For example, same as in the foregoing second and third structural examples, a plurality of the unit batteries having the configuration as shown in FIG. 15 may be connected in series by way of the conductive member 89 shown in FIG. 10, or the heat transfer plate 96 shown in FIG. 11.

In each structural example explained so far, a battery module is constructed by stacking up a plurality of the unit batteries, where the positive electrode cell and the negative electrode cell are disposed so as to be arranged in a same direction as the stacking direction (arranging direction) of the unit batteries, and a current collector plate (current collector member 47 in FIG. 6, positive electrode plate 85 and negative electrode plate 86 in FIG. 10, positive electrode current collector 99 and negative electrode current collector 100 in FIG. 12, and others) is disposed between the positive electrode cell of one of mutually adjacent unit batteries, and the negative electrode cell of other unit battery. By forming the current collector (the current collector member 47 in FIG. 6) by using a porous material, a refrigerant passage is formed inside the current collector. Or, between current collectors (positive electrode plate 85 and negative electrode plate 86 in FIG. 10, and positive electrode current collector 99 and negative electrode current collector 100 in FIG. 12), the conductive member 89 (see FIG. 10) forming the air communication passage 88 in the middle, or the heat transfer plate 96 (see FIG. 11) having passage holes as air communication passage 97 is inserted. In this configuration, the heat generated by the battery reaction can be efficiently taken into the refrigerant (for example, air) from the current collector, and can be released to outside, so that the cooling effect is enhanced.

In this example, air is used as refrigerant (heat transfer medium), but water, oil, or other liquid may be used. Not limited to these examples, any heat transfer medium made of gas or liquid generally known as heat transfer medium may be used.

Still more, a battery module is constructed by stacking up a plurality of the unit batteries, and at this time, the positive electrode cell and the negative electrode cell are disposed so as to be arranged in a same direction as the stacking direction (arranging direction) of the unit batteries, and a current collector plate (current collector member 47 in FIG. 6, positive electrode plate 85 and negative electrode plate 86 in FIG. 10, and positive electrode current collector 99 and negative electrode current collector 100 in FIG. 12, and others) is disposed between the positive electrode cell of one of mutually adjacent unit batteries, and the negative electrode cell of other unit battery, and one current collector plate (current collector member 47 in FIG. 6) is used commonly as a current collector for two adjacent unit batteries, or two mutually adjacent current collector plates (positive electrode plate 85 and negative electrode plate 86 in FIG. 10, and positive electrode current collector 99 and negative electrode current collector 100 in FIG. 12) may be connected to a wide contact area by way of the conductive member 89 (see FIG. 10) or heat transfer plate 96 (see FIG. 11), and therefore since a plurality of unit batteries are connected in series, the equivalent internal resistance of the battery module may be further suppressed.

As described herein, by constructing the battery module as shown in each structural example, and installing the cooling structure, heat generation by battery reaction can be suppressed, and deterioration of battery is suppressed, and the battery life can be extended. Moreover, the equivalent internal resistance of the battery module can be suppressed further. Hence, the nickel hydrogen battery 8 is extended in life, and the equivalent internal resistance may be further smaller.

6. Summary

As described herein, according to the electric railway power-supply system in the first preferred embodiment of the invention, at the substation 9, the nickel hydrogen battery 8 is directly coupled to the feeder line 5 and the wiring 15. In this configuration, very expensive charge-discharge control device such as boosting and step-down chopper is not needed, thus the entire device is simplified in structure and the manufacturing cost is reduced. Besides, there is no delay in operation due to charge-discharge control device, and it is excellent in rapid charge-discharge characteristic, and the feeder line voltage can be stabilized. And if the boosting and step-down chopper used as the charge-discharge control device is omitted, it is free from occurrence of harmonic noise which may disturb the signal device.

The electric railway power-supply system in the first preferred embodiment of the invention does not require charge-discharge control device, and the installation space for the device is not needed. Generally, the nickel hydrogen battery is high in volume energy, and vast space for installation is not needed even in the case of the nickel hydrogen battery 8 of high capacity composed of a multiplicity of unit batteries. As shown in the structural examples described above, by composing the nickel hydrogen battery 8 by using the battery module formed by stacking up unit batteries, the size is further reduced, and the space for installation may be smaller. For example, the nickel hydrogen battery 8 of 750 V and 800 Ah used in the demonstration test is 18 $m^3$ in its volume.

Since the nickel hydrogen battery 8 is small in internal resistance, the amount of heat generation in the battery is smaller, the heat loss is reduced, and the heat releasing device of the battery may be decreased.

In the electric vehicle of railway, sudden changes in current and voltage occur due to instantaneous on/off of a large current, derailing of power line and pantograph, or derailing of third rail and current collector shoe. Since the nickel hydrogen battery has a capacitor effect, and in the event of sudden rise of voltage, or in the event of sudden release of large current, as compared with other batteries, the voltage changes are smooth on the whole as the battery. When the unit batteries of the nickel hydrogen battery 8 are formed as unit batteries shown in FIG. 15 as an example of durability enhancement described above, the capacitor effect of the nickel hydrogen battery 8 may be further enhanced.

Second Preferred Embodiment

1. Configuration and Operation of Electric Railway Power-Supply System

Figure 16:
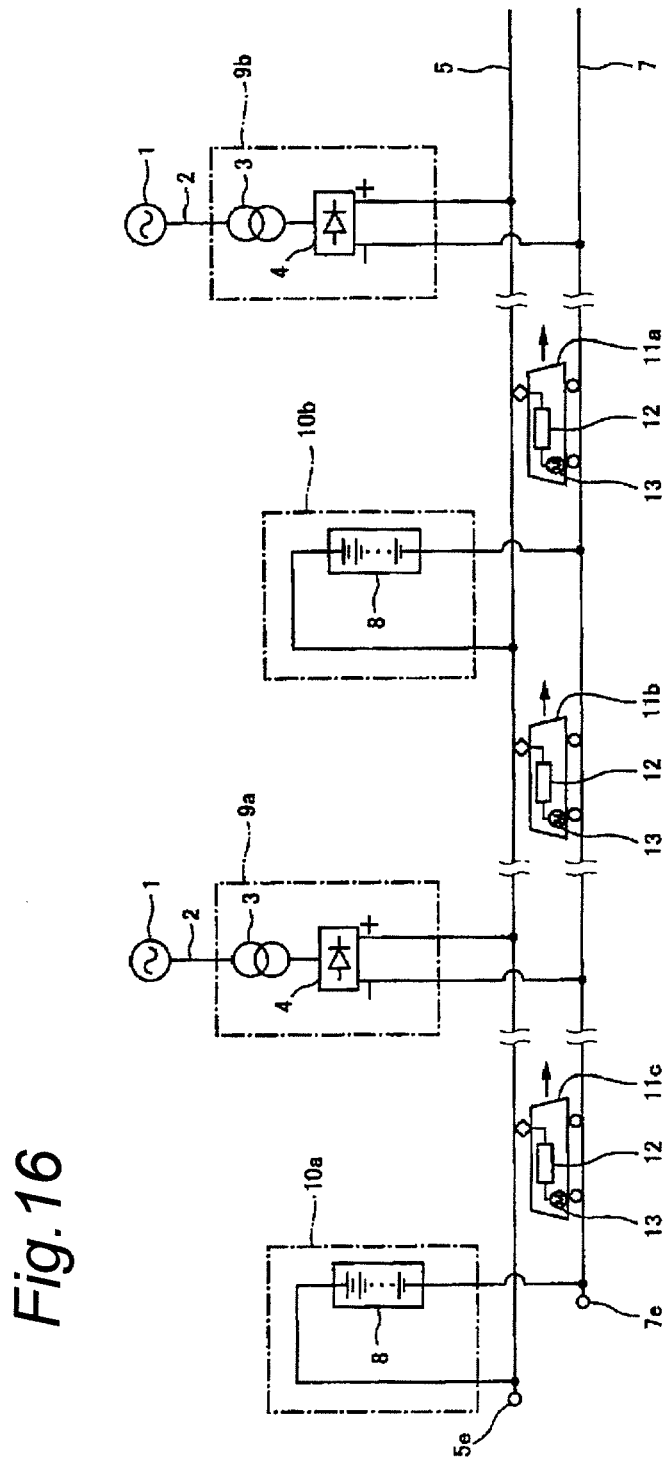
FIG. 16 is an outline structural diagram of an electric railway power-supply system provided with a nickel hydrogen battery in a second preferred embodiment of the invention.

FIG. 16 is an outline structural diagram of an electric railway power-supply system in a second preferred embodiment of the invention. In the first preferred embodiment, the nickel hydrogen battery 8 was installed at the substation 9 for electric railway. By contrast, in the electric railway power-supply system in the second preferred embodiment of the invention, electric power storage and supply devices 10a and 10b including the nickel hydrogen battery 8 are installed at other positions than the substation 9, such as intermediate points between a substation and other substation for electric railway.

The battery module for composing the nickel hydrogen battery 8 to be used in the electric railway power-supply system in the second preferred embodiment of the invention may be the same as the battery module for composing the nickel hydrogen battery 8 used in the first preferred embodiment.

In the electric railway power-supply system shown in FIG. 16, the electric power storage and supply devices 10a and 10b have a structure in which the nickel hydrogen battery 8 is directly coupled to the feeder line 5. Herein, the structure in which the nickel hydrogen battery 8 is directly coupled to the feeder line 5 is meant, as same in the first preferred embodiment, that is, the nickel hydrogen battery 8 is directly coupled to the feeder line 5 without resort to a charge-discharge control device. The nickel hydrogen battery 8 has its positive electrode side external terminal connected to the feeder line 5, and its negative electrode side external terminal connected to the return conductor (rail) 7. That is, a pair of external terminals of the nickel hydrogen battery 8 are connected to the feeder line 5 and the return conductor 7. As mentioned in the first preferred embodiment, the nickel hydrogen battery is small in voltage variations in relation to the SOC, and charge-discharge control device is not needed, and it can be coupled directly to the feeder line 5 and the return conductor 7.

The electric power storage and supply devices 10a and 10b are installed at a different place from the yard of the substations for electric railway (substations for electric vehicle) 9a and 9b, and the nickel hydrogen batteries 8 of the electric power storage and supply devices 10a and 10b are directly coupled to portions of the feeder line 5 different from the connection position of the substations 9a and 9b and the feeder line 5. More specifically, at the electric power storage and supply device 10b, the nickel hydrogen battery 8 is directly coupled to the feeder line 5 at an intermediate point of the substation 9a for electric railway and the substation 9b for electric railway. As for the electric power storage and supply device 10a, the nickel hydrogen battery 8 is directly coupled to the feeder line 5 at a position closer to an end portion 5e of the feeder line 5 from the closest substation 9a for electric railway to the end portion 5e of the feeder line 5, or at the end portion 5e of the feeder line 5.

In the electric railway power-supply system of the present embodiment having such configuration, the regenerative power generated in the electric vehicles 11a, 11b, and 11c is accumulated in the nickel hydrogen battery 8 installed in the electric power storage and supply devices 10a and 10b. The electric power accumulated in the nickel hydrogen battery 8 is supplied appropriately to the electric vehicles 11a, 11b, and 11c, depending on the voltage state of the feeder line 5.

In this configuration, when the voltage of the feeder line 5 becomes lower than the voltage of the nickel hydrogen battery 8 in the electric power storage and supply devices 10a and 10b, the power is discharged from the nickel hydrogen battery 8 into the feeder line 5, and decline of the feeder line voltage is suppressed. As a result, troubles in running of the individual electric vehicles due to decline of the feeder line voltage can be prevented, and the running performance of the electric vehicles is guaranteed, and inconvenience in operation of the entire electric vehicles can be avoided. Further, at the time of generation of regenerative power, if the feeder line voltage begins to rise above the voltage of the nickel hydrogen battery 8 in the electric power supply and storage devices 10a and 10b, the nickel hydrogen battery 8 is charged, and elevation of the feeder line voltage is suppressed. As a result, regeneration failure or other troubles can be prevented, and the running energy of the electric vehicles is not spent wastefully.

Herein, the feeder line 5 itself has its own resistance, as when becoming more remote from the substation, the voltage decline becomes larger. In other words, when the electric vehicle running at a point remote from the substation accelerates and consumes a large amount of electric power, the voltage decline increases, and running of the electric vehicle may be disturbed. To the contrary, when the electric vehicle decelerates, the feeder line voltage is raised by the generated regenerative power. At this time, due to the resistance of the feeder line 5, the voltage elevation of the feeder line near the electric vehicle generating the regenerative power tends to be larger than the voltage elevation of the feeder line at a position closer to the substation as compared with the electric vehicle, and may result in regeneration failure or other problems.

This problem occurs in relation to the resistance of the feeder line 5, and the distance from the substation to the electric vehicle. In the second preferred embodiment of the invention, in particular, the electric power storage and supply devices 10a and 10b are installed between the substation 9a and the substation 9b, or near the terminal end or the initial end of the track. As a result, the distance between the electric power storage and supply devices 10a and 10b and the electric vehicles may be set relatively shorter, and it is effective to reduce the variations of the voltage decline of the feeder line at the time of discharging from the nickel hydrogen battery 8, or the voltage elevation of the feeder line voltage at the time of charging of the nickel hydrogen battery 8.

The electric power storage and supply devices 10a and 10b may be installed between substations as required, and are not required at all sections between substations. For example, if the distance between the substations is short, it is not necessary to install in this section. At the end portion of the feeder line, it may be installed as required, and it is not necessary if the distance between the end portion of the feeder line and the substation is short.

As far as the electric power storage and supply devices 10a and 10b are installed, if power failure occurs due to a trouble at a nearby substation, the electric vehicles may be driven to a nearest station by the supply of power from the electric power storage and supply devices 10a and 10b. Moreover, for a short time, the electric power storage and supply devices 10a and 10b may be utilized in place of the substation, so that the substation may be under maintenance by stopping the function of the substation temporarily.

When laying a track newly, the electric power storage and supply devices 10a and 10b may be installed between substations, and the interval between substations may be extended, and the number of substations may be curtailed. As compared with the electric power storage and supply devices 10a and 10b composed of the nickel hydrogen batteries 8, the construction cost of the substation is tremendous. Further, by abandoning the existing substation of the track, electric power storage and supply devices 10a and 10b may be installed, and the vacated land may be utilized effectively. Thus, the electric power storage and supply devices 10a and 10b may be used as substitutes for the substation, which is proved in the following demonstration test.

2. Demonstration Test Results

A demonstration test of the electric railway power-supply system in the second preferred embodiment of the invention was conducted. FIGS. 17A to 17D are diagrams showing the demonstration test results.

In this demonstration result, at a substation for electric railway in a certain double track section in Japan, for example, the nickel hydrogen battery 8 is connected between the feeder line 5 and the return conductor 7 so as to be connected in parallel to the rectifying device 4, and by stopping the function of the substation, the electric power storage and supply devices 10a and 10b having the nickel hydrogen battery 8 is used as the test unit, and the capacity of the electric power storage and supply devices 10a and 10b installed in an interval of two times of the ordinary interval of substations is tested.

In this demonstration test, the voltage specification of the feeder line is 750 V, and the specifications of the nickel hydrogen battery 8 is 712.5 V and 800 Ah. The rectifying device 4 in stopped state and the nickel hydrogen battery 8 are connected to the feeder line connected to electric vehicle cables for the up-train and the down-train. The nickel hydrogen battery 8 used in this test is composed, for example as shown in FIG. 2, by connecting four units 8A to 8D in parallel. Each one of the units 8A to 8D is composed of 19 battery modules of 37.5 V and 200 Ah connected in series. Each battery module is composed of 30 unit batteries connected in series.

Figure 17A:
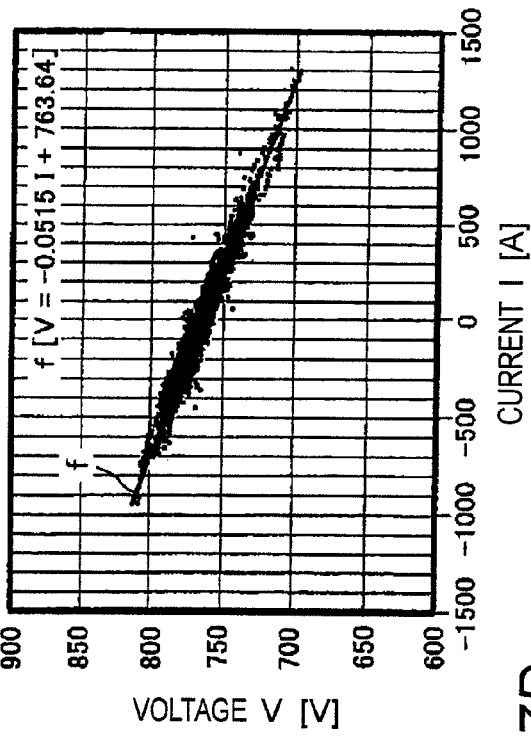
FIGS. 17A to 17D are diagrams showing demonstration test results of the electric railway power-supply system in the second preferred embodiment of the invention.
Figure 17B:
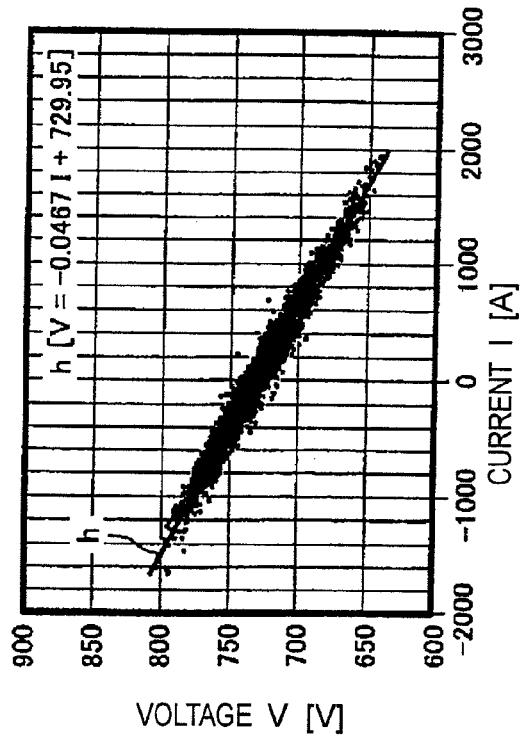
Figure 17C:
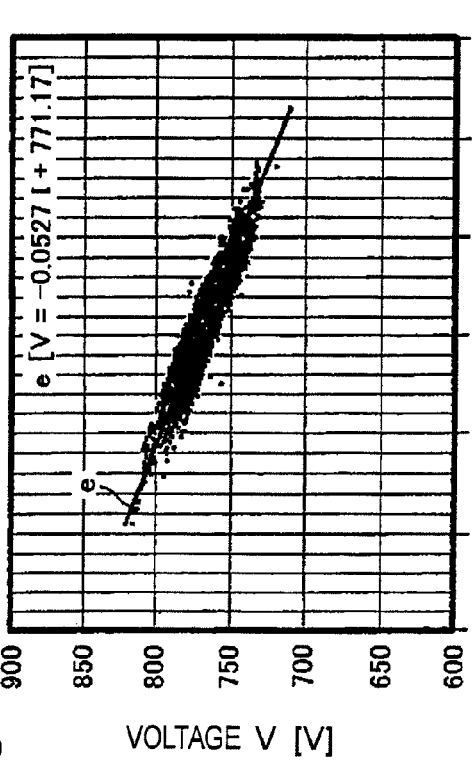
Figure 17D:
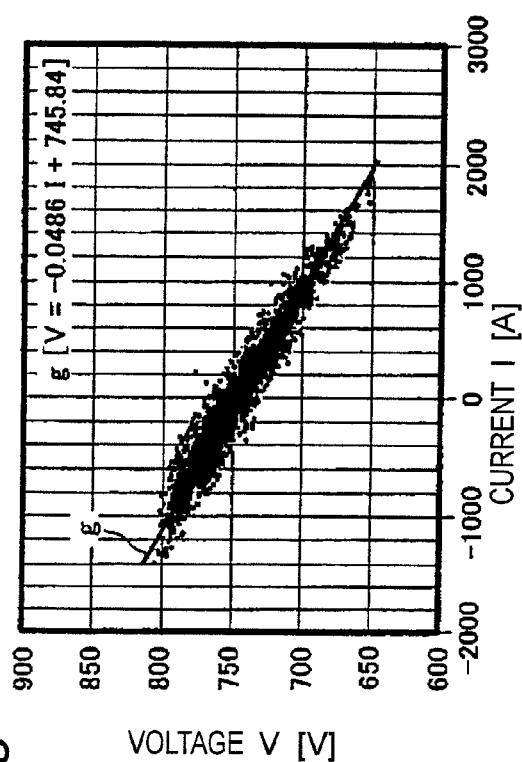

FIG. 17A is a diagram showing I-V (current-voltage) characteristic of the nickel hydrogen battery 8 from 5:00 to 6:00 in the morning of the day of the demonstration test. FIG. 17B is a diagram showing I-V characteristic of the nickel hydrogen battery 8 from 6:00 to 7:00 of the same day. FIG. 17C is a diagram showing I-V characteristic of the nickel hydrogen battery 8 from 7:00 to 8:00 of the same day. FIG. 17D is a diagram showing I-V characteristic of the nickel hydrogen battery 8 from 8:00 to 9:00 of the same day. Herein, a negative value of current indicates charging, and a positive value indicates discharging.

In FIGS. 17A to 17D, the I-V characteristics are shown by straight lines (e) to (h), and the straight lines (e) to (h) are approximately V=−0.05 I+752.

As known from the demonstration test results, on the straight lines (e) to (h), the internal resistance is about 0.05Ω. The highest voltage was 815 V, and the lowest voltage was 637 V, and even in the morning rush hours, at the feeder line voltage of 750 V, the variations settled within an allowable range of 900 V to 600 V, and it is hence confirmed that the power feeding facility by nickel hydrogen battery may be used in place of a substation facility.

3. Summary

The electric railway power-supply system in the second embodiment of the invention is composed by coupling the nickel hydrogen battery 8 directly to the feeder line 5, as same in the first preferred embodiment. Accordingly, a very expensive charge-discharge control device such as boosting and step-down chopper is not needed, thus the entire structure is simplified and the manufacturing cost is reduced. In addition, there is no operation delay due to charge-discharge control device, and the quick charge-discharge characteristic is excellent, and the feeder line voltage can be stabilized. Still more, if the boosting and step-down chopper used as charge-discharge control device can be omitted, there is no risk of occurrence of harmonic noise which may disturb the signal device.

In particular, the nickel hydrogen battery 8 is directly coupled to the feeder line 5 at a position remote from the substation, for example, at an intermediate point of a substation and another substation, or at the end portion of the feeder line 5e corresponding to the terminal end or the initial end of the track, and the electric power storage and supply devices 10a and 10b can be constructed. As a result, at a position remote from the substation, it is effective to suppress significant voltage declines of the feeder line caused by the resistance of the feeder line itself or acceleration of electric vehicles, and the running performance of the electric vehicles can be guaranteed without causing any problem in running of electric vehicles. At the same time, by suppressing significant voltage elevations of the feeder line 5 by regenerative power generated at the time of deceleration of electric vehicles, wasteful spending of running energy of electric vehicles due to regeneration failure or other troubles can be suppressed.

In the first preferred embodiment of the invention, in the electric railway power-supply system, the nickel hydrogen battery is installed at the substation for electric railway. In the second preferred embodiment of the invention, in the electric railway power-supply system, the nickel hydrogen battery is installed at other position than the substation for electric railway. That is, the location of the nickel hydrogen battery is not particularly specified. For example, one nickel hydrogen battery may be installed at the substation for electric railway, and other nickel hydrogen batteries may be installed at other positions than the substation for electric railway.

INDUSTRIAL APPLICABILITY

The electric railway power-supply system having the nickel hydrogen battery of the invention is preferably used as an electric railway power-supply system having a nickel hydrogen battery to be installed at a substation for electric railway.

Moreover, the electric railway power-supply system having the nickel hydrogen battery of the invention is preferably used as an electric railway power-supply system having a nickel hydrogen battery to be installed at a position remote from a substation for electric railway.

The invention claimed is:

1. An electric railway power-supply system comprising:
a substation for an electric vehicle;
a feeder line connected to the substation for supplying a direct-current power from the substation; and
a Nickel Metal Hydride battery, as a direct-current electric power facility, coupled directly to the feeder line.

2. An electric railway power-supply system to be installed in an electric railway substation, the electric railway power-supply system comprising:
a transformer for receiving power from an alternating-current power circuit,
a rectifying device connected to the transformer,
a feeder line connected to the rectifying device, and
a Nickel Metal Hydride battery, as a direct-current electric power facility, which is coupled directly to the feeder line.

3. The electric railway power-supply system according to claim 2, wherein the Nickel Metal Hydride battery includes at least one battery module, and
the battery module is structured such that
between a pair of opposite current collector plates, a plurality of battery cells having positive electrodes and negative electrodes partitioned by separators are layer-built so that the positive electrode of one of the adjacent battery cells and the negative electrode of the other of the adjacent battery cells are opposed,
between the adjacent battery cells, a common current collector serving as a dividing wall between the positive electrode of one battery cell and the negative electrode of the other battery cell is provided, and
the common current collector has a communication passage of heat transfer medium that is gas or liquid.

4. The electric railway power-supply system according to claim 3, wherein the common current collector includes a porous metal plate.

5. The electric railway power-supply system according to claim 3, wherein the common current collector includes a metal plate provided with a plurality of communication holes used as communication passage of the heat transfer medium.

6. The electric railway power-supply system according to claim 2, wherein the Nickel Metal Hydride battery includes at least one battery module, and
the battery module includes a plurality of battery cells,
each battery cell includes a plate-shaped positive electrode current collector and a plate-shaped negative electrode current collector which are provided oppositely to each other, a separator disposed between the positive electrode current collector and the negative electrode current collector, a positive electrode contacting the positive electrode current collector, and a negative electrode contacting the negative electrode current collector,
the plurality of battery cells are layer-built so that the positive electrode current collector of one of the battery cells is opposed to the negative electrode current collector of another battery cell which is adjacent to the one battery cell, and
a communication passage of heat transfer medium that is gas or liquid is provided between the mutually adjacent battery cells.

7. The electric railway power-supply system according to claim 6, wherein a conductive heat transfer plate having communication holes in the communication passage of the heat transfer medium is inserted between one of the mutually adjacent battery cells and the other battery cell, so that the heat transfer plate contacts the positive electrode current collector of the one battery cell and the negative electrode current collector of the other battery cell.

8. The electric railway power-supply system according to claim 6, wherein between the one battery cell and the other battery cell which is adjacent to the one battery cell, a plurality of conductive members are inserted so that each conductive member contacts the positive electrode current collector of the one battery cell and the negative electrode current collector of the other battery cell, and that a communication passage is formed between the one battery cell and the other battery cell.

9. The electric railway power-supply system according to claim 7, wherein the heat transfer plate is made of an aluminum plate.

10. The electric railway power-supply system according to claim 2, wherein the Nickel Metal Hydride battery includes at least one battery module, and
the battery module includes a plurality of battery cells,
each battery cell has a structure in which a space between plate-shaped positive and negative electrode current collectors which are disposed oppositely to each other is filled with an electrolyte solution, a plurality of positive electrode sheets are disposed from the positive electrode current collector toward the negative electrode current collector, and a plurality of negative electrode sheets are disposed from the negative electrode current collector toward the positive electrode current collector such that a positive electrode sheet having a positive electrode active material and a negative electrode sheet having a negative electrode active material are assembled alternately, and a separator is interposed between each positive electrode sheet and each negative electrode sheet,
the plurality of battery cells are layer-built so that the positive electrode current collector of one of the battery cells is opposed to the negative electrode current collector of another battery cell which is adjacent to the one battery cell, and
a communication passage of heat transfer medium that is gas or liquid is provided between the mutually adjacent battery cells.

11. The electric railway power-supply system according to claim 10, wherein a conductive heat transfer plate having communication holes in the communication passage of the heat transfer medium is inserted between one of the mutually adjacent battery cells and the other battery cell, so that the heat transfer plate contacts the positive electrode current collector of the one battery cell and the negative electrode current collector of the other battery cell.

12. The electric railway power-supply system according to claim 11, wherein the heat transfer plate is made of an aluminum plate.

13. The electric railway power-supply system according to claim 10, wherein between the one battery cell and the other battery cell which is adjacent to the one battery cell, a plurality of conductive members are inserted so that each conductive member contacts the positive electrode current collector of the one battery cell and the negative electrode current collector of the other battery cell, and that a communication passage is formed between the one battery cell and the other battery cell.

14. An electric railway power-supply system comprising:
a feeder line which is coupled to a substation for an electric vehicle and receives a direct-current power from the substation; and
an electric power storage and supply device having a Nickel Metal Hydride battery,
wherein the Nickel Metal Hydride battery is directly coupled to the feeder line, and the electric power storage and supply device is installed at a different place from the yard of the substation.

15. The electric railway power-supply system according to claim 14, wherein the Nickel Metal Hydride battery includes at least one battery module, and
the battery module is structured such that
between a pair of opposite current collector plates a plurality of battery cells having positive electrodes and negative electrodes partitioned by separators are layer-built so that the positive electrode of one of the battery cells is opposed to the negative electrode of another of the adjacent battery cells which is adjacent to the one battery cell,
between the adjacent battery cells, a common current collector plate serving as a dividing wall between the positive electrode of the one battery cell and the negative electrode of the other battery cell is provided, and
the common current collector has a communication passage of heat transfer medium that is gas or liquid.

16. The electric railway power-supply system according to claim 15, wherein the common current collector includes a porous metal plate.

17. The electric railway power-supply system according to claim 15, wherein the common current collector includes a metal plate provided with a plurality of communication holes used as communication passage of the heat transfer medium.

18. The electric railway power-supply system according to claim 14, wherein the Nickel Metal Hydride battery includes at least one battery module, and
the battery module includes a plurality of battery cells,
each battery cell includes a plate-shaped positive electrode current collector and a plate-shaped negative electrode current collectors which are provided oppositely to each other, a separator disposed between the positive electrode current collector and the negative electrode current collector, a positive electrode contacting the positive electrode current collector, and a negative electrode contacting the negative electrode current collector,
the plurality of battery cells are layer-built so that the positive electrode current collector of one of the battery cells is opposed to the negative electrode current collector of another battery cell which is adjacent to the one battery cell, and
a communication passage of heat transfer medium that is gas or liquid is provided between the mutually adjacent battery cells.

19. The electric railway power-supply system according to claim 18, wherein a conductive heat transfer plate having communication holes in the communication passage of the heat transfer medium is inserted between one of the mutually adjacent battery cells and the other battery cell, so that the heat transfer plate contacts the positive electrode current collector of the one battery cell and the negative electrode current collector of the other battery cell.

20. The electric railway power-supply system according to claim 19, wherein the heat transfer plate is made of an aluminum plate.

21. The electric railway power-supply system according to claim 18, wherein between the one battery cell and the other battery cell which is adjacent to the one battery cell, a plurality of conductive members are inserted so that each conductive member contacts the positive electrode current collector of the one battery cell and the negative electrode current collector of the other battery cell, and that a communication passage is formed between the one battery cell and the other battery cell.

22. The electric railway power-supply system according to claim 14, wherein the Nickel Metal Hydride battery includes at least one battery module, and
the battery module includes a plurality of battery cells,
each battery cell has a structure in which a space between plate-shaped positive and negative electrode current collectors which are disposed oppositely to each other is filled with an electrolyte solution, a plurality of positive electrode sheets are disposed from the positive electrode current collector toward the negative electrode current collector, and a plurality of negative electrode sheets are disposed from the negative electrode current collector toward the positive electrode current collector such that a positive electrode sheet having a positive electrode active material and a negative electrode sheet having a negative electrode active material are assembled alternately, and a separator is interposed between each positive electrode sheet and each negative electrode sheet,
the plurality of battery cells are layer-built so that the positive electrode current collector of one of the battery cells is opposed to the negative electrode current collector of another battery cell which is adjacent to the one battery cell, and
a communication passage of heat transfer medium that is gas or liquid is provided between the mutually adjacent battery cells.

23. The electric railway power-supply system according to claim 22, wherein a conductive heat transfer plate having communication holes in the communication passage of the heat transfer medium is inserted between one of the mutually adjacent battery cells and the other battery cell, so that the heat transfer plate contacts the positive electrode current collector of the one battery cell and the negative electrode current collector of the other battery cell.

24. The electric railway power-supply system according to claim 23, wherein the heat transfer plate is made of an aluminum plate.

25. The electric railway power-supply system according to claim 22, wherein between the one battery cell and the other battery cell which is adjacent to the one battery cell, a plurality of conductive members are inserted so that each conductive member contacts the positive electrode current collector of the one battery cell and the negative electrode current collector of the other battery cell, and that a communication passage is formed between the one battery cell and the other battery cell.

26. An electric railway power-supply system having a substation for electric railway and an electric power supply and storage device,
wherein the substation comprises:
a transformer for receiving power from an alternating-current power line,
a rectifying device connected to the transformer,
a feeder line connected to the rectifying device, and a first Nickel Metal Hydride battery as a direct-current power supply device, which is directly coupled to the feeder line, and the electric power supply and storage device includes a second Nickel Metal Hydride battery, and the second Nickel Metal Hydride battery is directly connected to the feeder line, and the electric power storage and supply device is installed in a place different from the yard of the substation.

27. The electric railway power-supply system according to claim 26, wherein the Nickel Metal Hydride battery includes at least one battery module, and the battery module includes a plurality of battery cells, each battery cell has a structure in which a space between plate-shaped positive and negative electrode current collectors which are disposed oppositely to each other is filled with an electrolyte solution, a plurality of positive electrode sheets are disposed from the positive electrode current collector toward the negative electrode current collector, and a plurality of negative electrode sheets are disposed from the negative electrode current collector toward the positive electrode current collector such that a positive electrode sheet having a positive electrode active material and a negative electrode sheet having a negative electrode active material are assembled alternately, and a separator is interposed between each positive electrode sheet and each negative electrode sheet, the plurality of battery cells are layer-built so that the positive electrode current collector of one of the battery cells is opposed to the negative electrode current collector of another battery cell which is adjacent to the one battery cell, and a communication passage of heat transfer medium that is gas or liquid is provided between the mutually adjacent battery cells.

* * * * *